United States Patent [19]
Garcia, Jr. et al.

[11] Patent Number: 5,448,702
[45] Date of Patent: Sep. 5, 1995

[54] ADAPTERS WITH DESCRIPTOR QUEUE MANAGEMENT CAPABILITY

[75] Inventors: Serafin J. E. Garcia, Jr., Boynton Beach; Michael S. Gatson, Boca Raton; Gary B. Hoch, Coral Springs; Eric H. Stelzer, Boca Raton; Donald G. Williams, Delray Beach, all of Fla.

[73] Assignee: International Business Machines Corporation, Armonk, N.Y.

[21] Appl. No.: 24,981

[22] Filed: Mar. 2, 1993

[51] Int. Cl.$^6$ .................. G06F 3/00; G06F 13/00
[52] U.S. Cl. ..................... 395/325; 395/375; 395/425; 395/725; 395/844; 395/848
[58] Field of Search ............. 395/325, 275, 425, 725, 395/400; 364/200, DIG. 2

[56] References Cited

U.S. PATENT DOCUMENTS

| | | | |
|---|---|---|---|
| 3,577,190 | 5/1971 | Corte et al. | 364/200 |
| 4,437,157 | 3/1984 | Witaka et al. | 395/275 |
| 4,546,430 | 10/1985 | Moore et al. | 395/725 |
| 4,636,946 | 1/1987 | Hartung et al. | 395/425 |
| 4,638,425 | 1/1987 | Hartung | 395/425 |
| 5,200,864 | 4/1993 | Dunn et al. | 364/DIG. 2 |

*Primary Examiner*—Jack B. Harvey
*Assistant Examiner*—David A. Wiley
*Attorney, Agent, or Firm*—Romualdas Strimaitis; Robert Lieber

[57] ABSTRACT

A processor stores descriptors without explicit linkages, in non-contiguous memory locations, and sequentially hands them off to an adaptor which manages scheduling and processing of data transfers defined by the descriptors. Each descriptor is handed off in a request signalling process in which the processor polls the availability of a request register in the adaptor, and writes the address of a respective descriptor to that register when it is available. The adapter then schedules processing of the descriptor whose address is in the request register. The adapter manages a "Channel Descriptor Table" (CDT), which defines the order of processing of descriptors designated by the requests. In effect, the CDT defines a linked list queue into which the adapter installs descriptors, in the sequence of receipt of respective requests. Using the CDT information, the adapter retrieves successively queued descriptors and controls performance of operations (data transfer or other) defined by them. Accordingly, descriptors in the queue are retrieved and respectively defined operations are performed, in the order of receipt of respective requests; as if the descriptors had been stored by the processor with explicit linking and chaining associations and handed off to the adapter as an explicitly chained set of descriptors. In a preferred embodiment, a "multi-channel adapter unit" (MAU), directing data transfers relative to multiple channels, contains one request register for all channels and a separate CDT and "request address port" dedicated to each channel. Requests accompanied by addresses designating these ports are "funneled" through the request register to CDT queues of respective channels. The processor can effectively remove a descriptor from any CDT queue, without potentially compromising handling of data transfers defined by other descriptors in the queue, by writing a "skip code" to the descriptor. Upon retrieving a descriptor with a skip code, the adapter automatically skips the operation defined by that descriptor and chains to a next descriptor (if the queue defined by the CDT is not empty).

25 Claims, 8 Drawing Sheets

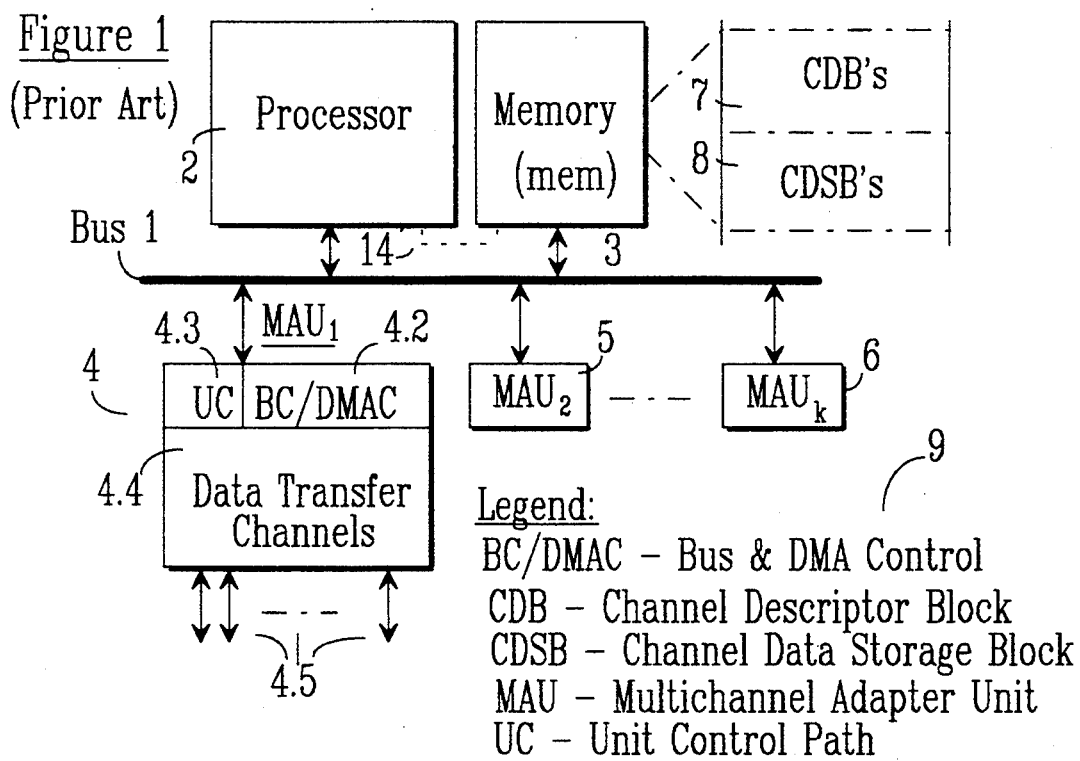
Figure 1 (Prior Art)
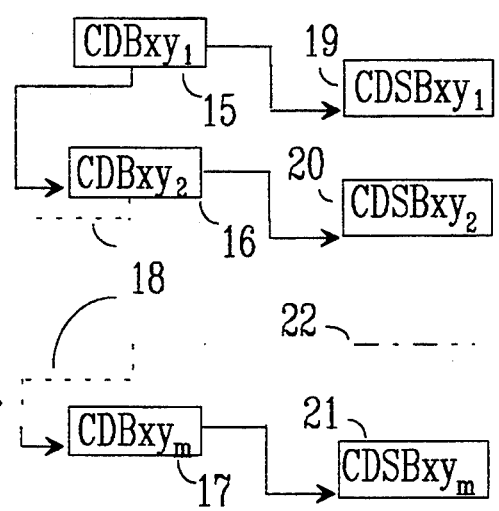
Figure 2 Mem Usage (Channelx, MAUy; receive &/or transmit) (Prior Art)
CDB's & CDSB's randomly located
Each CDB has pointer to CDSB; each CDB other than last one has pointer to next CDB
CDB pointers set only by processor

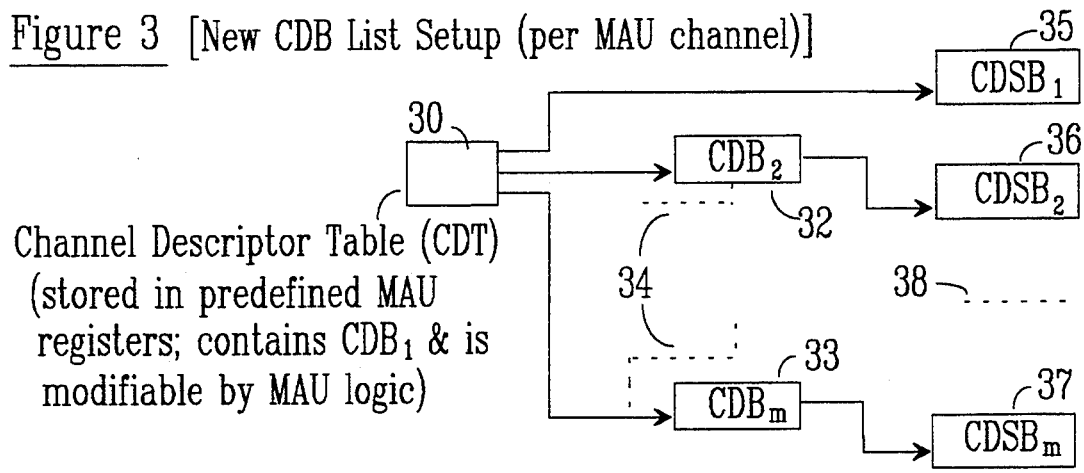
Figure 3 [New CDB List Setup (per MAU channel)]
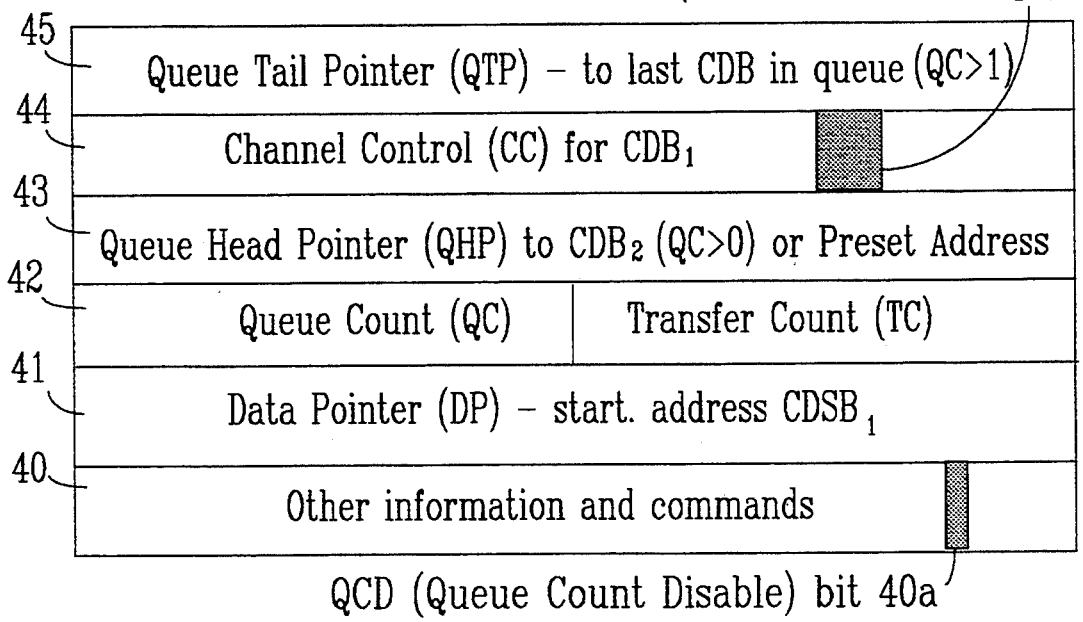
Figure 4 (CDT Format)

Figure 5    CDB (in mem)
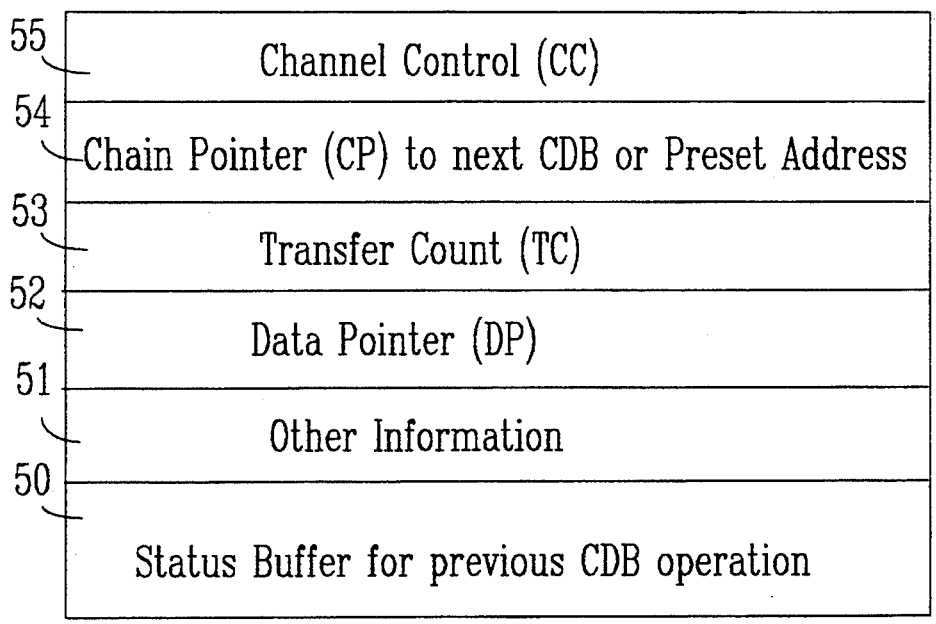
Figure 6  (CDB Enqueueing)
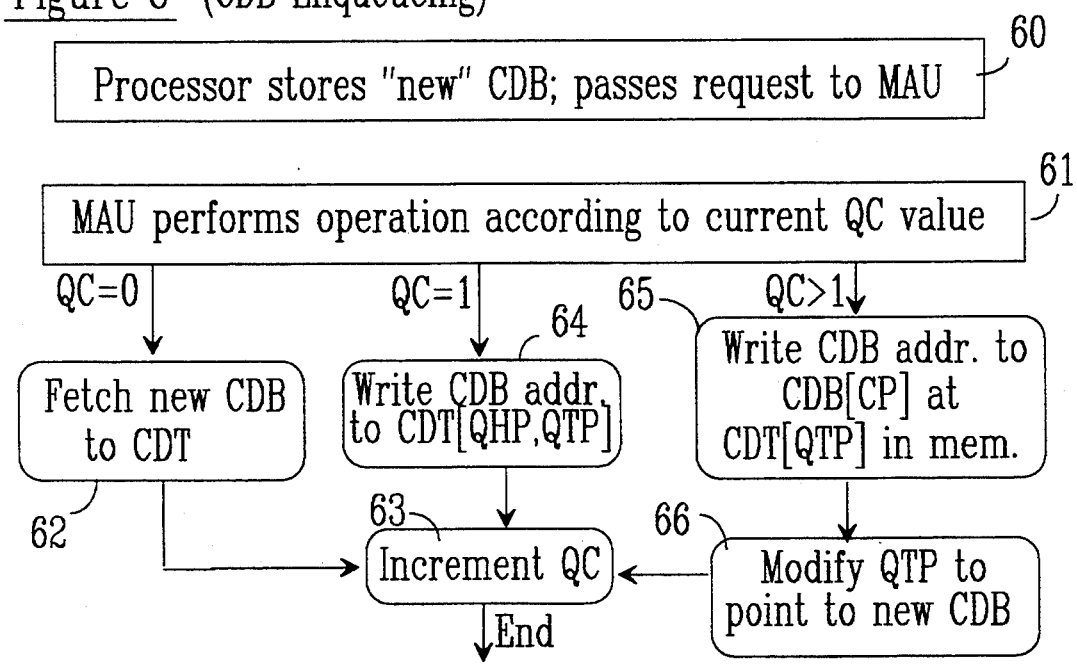

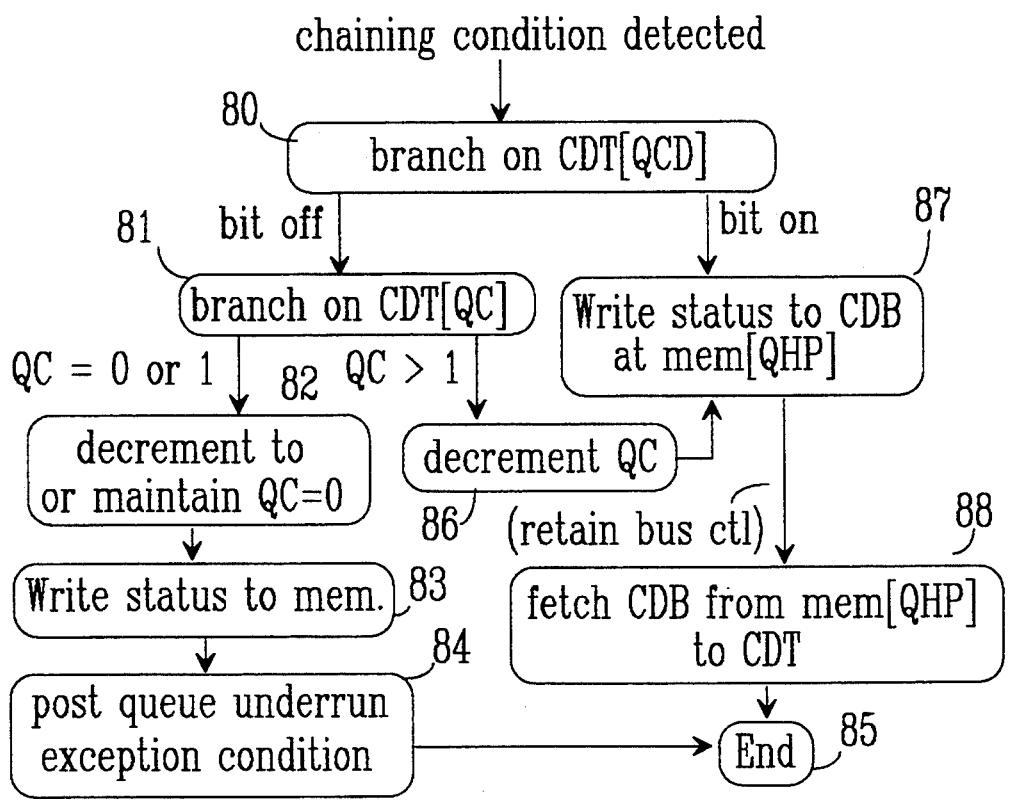
Figure 7 (dequeueing)
Figure 8 (effect of QCD bit on chaining)

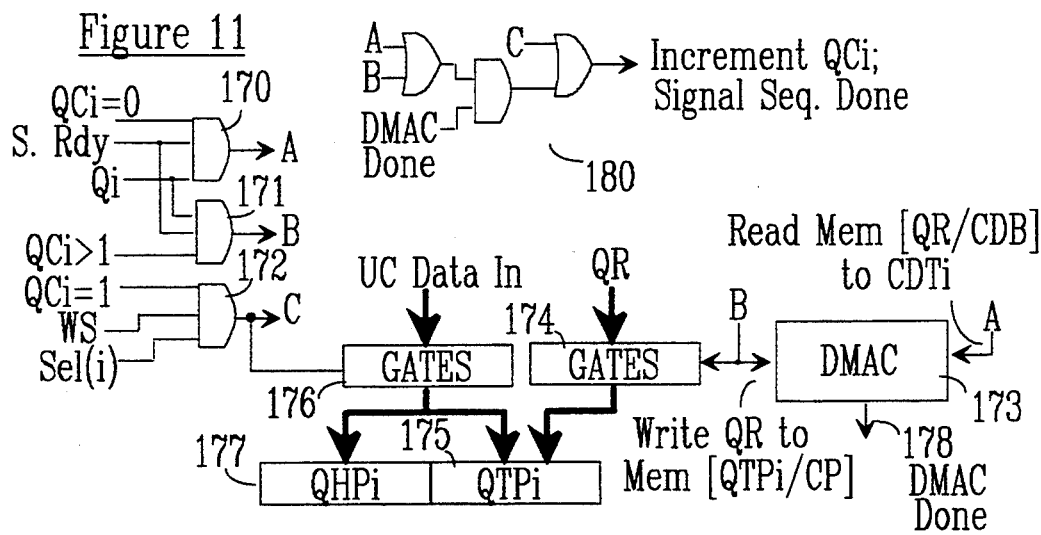
Figure 11
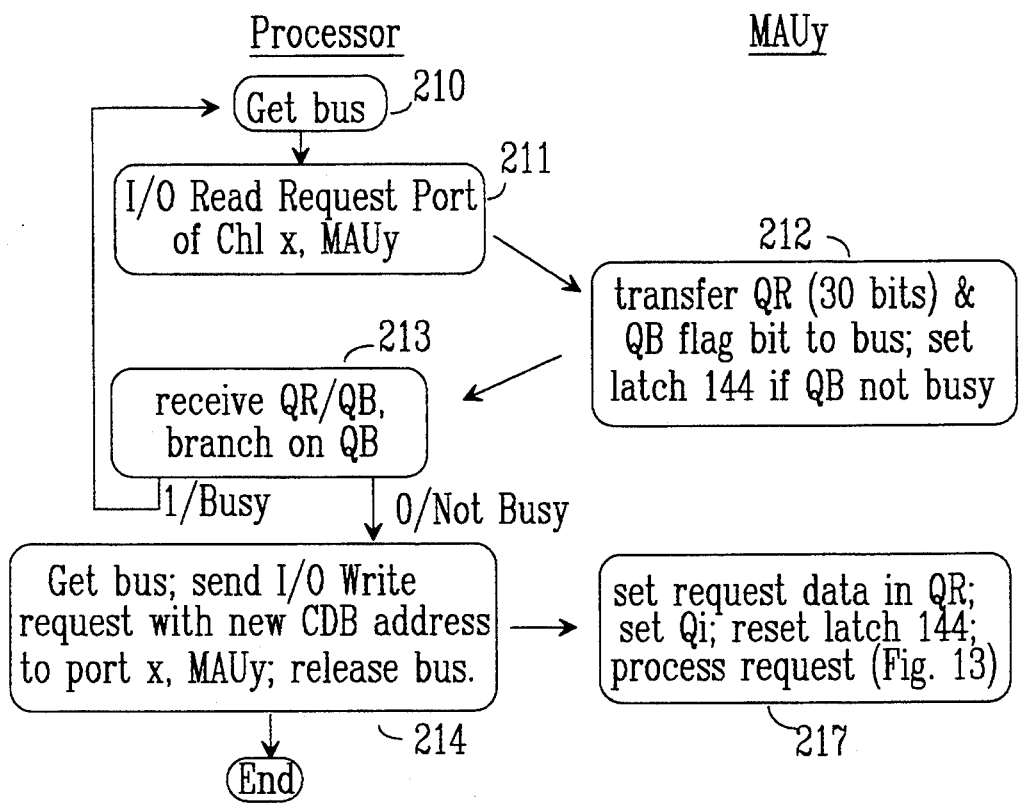
Figure 12 (processor/MAU sequence – enqueue Request)

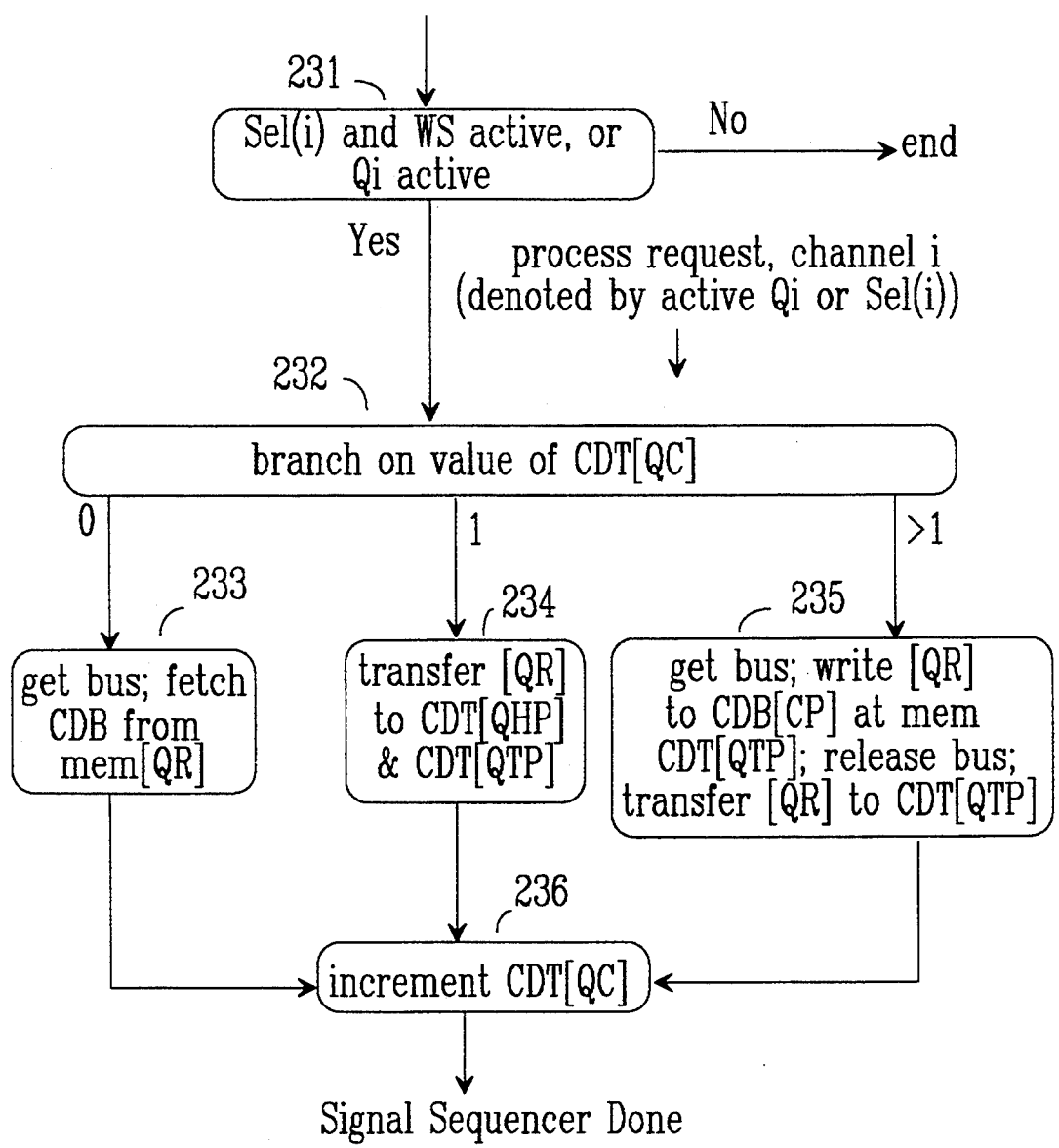
Figure 13 (MAU Request Scheduling)

ADAPTERS WITH DESCRIPTOR QUEUE MANAGEMENT CAPABILITY

FIELD OF THE INVENTION

This invention relates to channel adapters for interfacing between memory and data communication channels in data processing systems.

Background Of The Invention

Presently known data processing systems use channel adapters to control data transfers between memory and channels that connect to devices or data communication links. Such adapters may have access to memory in a direct memory access (DMA) mode, and perform their data transfer operations offline to processors which manage allocation of memory space. A single adapter unit may control either multiple channels or a single channel. An adapter unit which controls multiple channels is hereafter termed a Multichannel Adapter Unit (or MAU).

Operations performed by such adapters may be defined by channel descriptor blocks (abbreviated CDB's). Each CDB is prepared in memory, by a processor, and dispatched to an adapter; usually, in a signalling operation which provides the adapter with an indication of the memory location at which the CDB is stored, and, in respect to an MAU, an indication designating a particular channel. Operating offline to the processor, the adapter (or MAU) accesses memory, retrieves the CDB, and controls execution of the data transfer process defined by that CDB relative to the appropriate channel.

Multiple CDB's may be serially chained and dispatched to an adapter in a single "batch" signalling operation; typically, an operation in which only the location of a first CDB, in a chained group of CDB's, is transferred to the adapter (or MAU). Operating offline, the adapter sequentially processes the CDB's in their chained sequence; retrieving the first CDB in the group, processing it, locating and retrieving the next CDB in the group, processing it, and so forth.

In retrieving the CDB's chained to a first CDB, in a chained group of CDB's, the adapter derives the location of each chained CDB either by using "pointer" information explicitly provided (by the processor) in the preceding CDB, or implicitly (e.g. by adding a constant to or subtracting a constant from the location of the preceding CDB). Usually, the explicit locating method is used relative to chained CDB's stored in non-contiguous (fragmented) memory spaces, and the implicit method is used relative to chained CDB's stored contiguously. In order to keep track of non-contiguous locations of CDB's in a chained group, the originating processor may configure them in a linked list queue, in which all but the last CDB in the group contain pointers to locations of respective next CDB's in the group, and maintain a table defining at least the length of the queue (number of CDB's in the group) and its head and tail end locations (i.e. respective memory locations at which first and last CDB's in the group are stored).

Memory management functions supervised by the processor must be suitably coordinated with real time CDB processing activities in the adapter channels, so that stored CDB's are not overwritten either prematurely (i.e. before the adapter has processed respective CDB's) or too late (e.g. in instances where the adapter follows a circular sequence through a prearranged series of memory spaces containing chained CDB's, commonly termed a "circular buffer", it may be necessary for the processor to write new information into each circular buffer storage space within the fastest time that the adapter might circle the buffer; so that the adapter does not repeat handling of an old CDB).

In general, the processor coordinates memory usage with adapter activities by monitoring channel activity status associated with interrupt request signals presented by the adapter. Among other things, such requests are presented by the adapter as it completes its processing of a CDB. At some time after each request (or possibly after several requests from the same adapter), the processor exchanges signals with the adapter for retrieving the status information details associated with the request. However, in most systems, there is an indeterminate delay between the signalling of adapter interrupt requests and the processor's retrieval and interpretation of associated status information. Consequently, at the time the processor retrieves status for a data transfer associated with a first CDB in a chained group, the immediate status of adapter activity relative to the group is indeterminate; i.e. the adapter may be processing another CDB "far along" in the group or it may have completed its handling of the group entirely (or, in a circular buffer environment, the adapter could be close to completing a circuit of the buffer, and thereby approaching the position of the CDB whose status is being interpreted).

The delay between the presentation of interrupt requests and the processor's retrieval of associated status varies according to a number of well known factors; including the processor's workload and its supervisory organization (for example, in some systems, the processor may be organized to collect status in batches relative to multiple CDB's so as to efficiently utilize available bus bandwidth between it and adapters it supervises).

Accordingly, in order to ensure coordination with channel activity, the processor may require an adapter channel to be in a definitely known initial state before dispatching a new CDB (or CDB chain) to that channel; e.g the processor may require the channel to be undergoing reactivation after a prior known period of inactivity. Although this type of requirement may be counterproductive, in respect to the throughput efficiency of the channel and system, the need for coordination may outweigh the detriment to productivity.

The present invention eliminates the need for such processor-adapter coordination, and allows the processor to dispatch CDB's to continuously active adapter channels without risk of compromising activities under way in a channel when a CDB is dispatched to it.

Objects Of The Invention

An object of the invention is to provide a processor/adapter arrangement permitting a processor to dispatch CDB's serially from non-contiguous locations in a memory, for defining a series of data transfer operation to be conducted in a continuously active adapter channel, wherein the dispatching functions of the processor can be carded out without any coordination to activities in the respective channel and wherein the adapter invariably will perform the operations defined by the dispatched CDB's in a reliable manner, without compromising any activities in the respective channel.

Another object is to provide a processor/adapter arrangement permitting a processor to sequentially transfer information to an adapter indicating storage locations of an arbitrarily long series of CDB's non-contiguously stored in a memory, the CDB's in the series defining a respective series of operations to be conducted relative to a single continuously active channel in the adapter, wherein the transfers of the information indicating the CDB locations are conducted at arbitrary intervals of time and without any coordination with activities in the respective adapter channel, and wherein the CDB's in the respective locations are not explicitly linked; and wherein the adapter is logically equipped to process all of the CDB's in the series as if they had been initially chained by the processor and dispatched together in a linked list queue.

Another object is to provide a processor/adapter arrangement in which a processor can sequentially dispatch to an adapter an arbitrarily long series of CDB's, which CDB's are stored non-contiguously in a memory, have no explicit linkage defining their relative locations in the memory, and define a respective series of operations to be conducted by the adapter relative to a single currently active channel; wherein the adapter reliably schedules and performs the respectively defined series of operations as if all of the CDB's in the series had been chained and preconfigured in a linked list queue structure before a first of them was dispatched.

Another object is to provide a processor/adapter arrangement, as above, in which the adapter contains registers, dedicated to the continuously active channel associated with the dispatched series of CDB's, for holding a "Channel Descriptor Table" (CDT) useful by the adapter for constructing a linked list queue defining the number of CDB's in the dispatched series which have not yet been processed by the adapter, and defining the locations in memory of at least a first and last unprocessed CDB's in the series. A related object is to provide adapter registers forming a CDT table, as just defined, which can be written to by either the adapter or the processor; thereby enabling the adapter to dynamically construct and maintain a linked list queue relative to a dispatched series of CDB's while allowing the processor to pre-establish a linked list queue relative to a series of chained CDB's which can be dispatched in a single batch signalling operation.

Another object is to provide a processor/adapter arrangement in which a processor can modify a CDB, within a series of non-contiguously stored CDB's previously dispatched to a continuously active adapter channel, while the instantaneous status of activity in the respective adapter channel is not determinable by the processor, and without potentially compromising activities instantaneously being conducted in the respective channel relative to other CDB's in the same series.

Another object is to provide a processing system arrangement wherein a processor can sequentially transfer signals to an adapter designating non-contiguous storage locations of an arbitrary length series of CDB's, which CDB's define a respective series of operations to be conducted by the adapter relative to a single channel and do not contain information explicitly linking their respective locations, and wherein the adapter is logically equipped to establish explicit linkages in the stored CDB's so that each CDB in the series explicitly points to the next CDB in the series; whereby the respectively defined series of operations can be carried out by the adapter as if all of the CDB's in the series had been chained and preconfigured in a linked list queue prior to the transfer of the information defining the location of the first CDB in the series.

Another object is to provide an adapter which is logically equipped to construct and manage linked list queues defining explicit links between locations of CDB's that are stored non-contiguously in a memory and dispatched to the adapter without such links.

Another object is to provide an adapter containing registers which can be set by either a host processor or the adapter to define a linked list queue of CDB's defining data block transfers to be performed sequentially by the adapter. A related object is to provide an adapter, as just characterized, in which the registers contain a queue count (QC) factor decrementable by the adapter which defines the number of CDB's in the queue, and a queue count disable (QCD) factor which can be set by the processor to either allow or prevent decrementing of the QC factor, wherein, with the QCD factor set to prevent decrementing of the QC factor, memory spaces containing the queue can be configured by the processor as a circular buffer, through which the adapter cycles repeatedly as it processes CDB's dynamically written into the spaces by the processor.

Another object is to provide a multichannel adapter unit (MAU), which is capable of directing data transfers relative to multiple channels, each definable by a series of non-contiguously stored CDB's that are individually dispatched to the MAU by a processor without explicit chaining or locating linkages; wherein the MAU is logically equipped to receive each series while the respective channel is continuously active, to establish explicit linkages between the CDB's in each received series and to conduct respective series of operations defined by each series without further direction from the processor and without compromising any activities in the respective channel.

Another object is to provide a computer system containing a processor, a memory, and a multichannel adapter unit (MAU), wherein the MAU directs data transfers offline to the processor, in each of a plurality of channels, each transfer definable by a series of channel descriptors which are stored in the memory without explicit information defining the order of their execution or their relative locations in memory but whose locations are signalled to the MAU by the processor in a sequence implying the order in which the transfers are to be conducted, and in which the descriptors whose locations are so signalled are transformed by operations of the MAU into a set of descriptors explicitly ordered in conformance with the order of presentation by the processor of signals indicating their respective locations; whereby the MAU is able to process all of the descriptors in the series of descriptors as if they had been explicitly chained prior to transfer of the signals defining the location of the first descriptor in the series, but whereby the MAU can receive the signals defining location of any descriptor in the series while it is processing a preceding descriptor in the series, or even at an arbitrary time after it has finished processing all preceding descriptors in the series.

Another object is to provide a computer system containing a processor, a random access memory, and a multichannel adapter unit (MAU) controlling direct access to the memory and directing data transfer operations between the memory and a plurality of peripheral channels, wherein the data transfer operation of the adapter relative to each peripheral channel is defined by a respective series of unlinked descriptors stored by the processor in random locations in the memory, and wherein the descriptors in each respective stored series are transformed by operations of the adapter into a linked list set. A related object is to provide a computer system as just defined in which linked list transforming operations of the adapter are initiated by requests transferred from the processor to the adapter, each request containing the address of an unlinked descriptor that is to be joined to a previously linked series.

A related object is to provide a computer system as just defined in which each request sent to the adapter is stored by the adapter in a single request register common to all peripheral channels, in which each request is sent to the adapter through a port address uniquely assigned to one of the channels, and in which the adapter responds to each request received through a port address by setting a latch uniquely associating the contents of the request register to the channel to which the port address is assigned.

A related object is to provide a computer system as just defined, in which a "request handling status" indication in the adapter is set to a "busy" indicating state, when a request is initially entered into the adapter's request register, and thereafter reset to a "not busy" indicating state when the adapter finishes scheduling its processing of a CDB whose location is designated by the entered request, and wherein the processor, prior to presenting each request to the adapter, polls the state of the indication, repeating the poll after each return of a "busy" indicating state, and presenting the request for unconditional and unacknowledged entry into the request register upon a return of a "not busy" indicating state.

A related object is to provide a computer system as just defined which contains a bus connecting plural adapters to the processor and memory, in which each request presentation and "queue busy" response is completed during a single round of processor access to the bus.

A related object is to provide a computer system as just defined in which the adapter processes each request by getting access to the bus and either retrieving a descriptor from memory, at an address defined by information in the request register, or modifying a descriptor in memory by writing into that descriptor the address contained in the request register.

Another object is to provide an adapter having logical capability for dynamically managing linked list descriptor queues. A related object is to provide an adapter as just characterized, wherein the adapter is capable of constructing a linked list descriptor queue, and adding unenqueued descriptors to the queue, in response to descriptor designating requests sequentially received from a processor at random intervals of time; wherein any descriptor designating request may be received while the adapter is actively handling data transfers defined by one or more descriptors associated with previously received descriptor designating requests.

Another object is to provide a Multichannel Adapter Unit (MAU), for directing data transfers relative to multiple channels, which has logical capability for dynamically managing linked list queues of descriptors. A related object is to provide an MAU, as just characterized, which is responsive to signals from a processor designating memory storage locations of descriptors directed to individual channels for scheduling processing of data transfers defined by respective descriptors while actively handling data transfers in the respective channels; wherein the designated descriptor storage locations do not contain explicit queue linkages at the time such signals are presented by the processor. A related object is to provide an MAU as just characterized wherein the signals furnished by the processor are funneled through a single descriptor request register common to all channels. A related object is to provide an MAU as just characterized, wherein the processor can effectively remove a descriptor from a channel queue managed by the MAU, by writing information into a storage location previously signalled to the MAU, without regard to the status of data transfer activity in the associated channel and without potentially compromising data transfer activities defined by other descriptors in the respective channel's queue.

Summary Of The Invention

In accordance with the present invention, a computer system and DMA (direct memory access) channel adapter are configured to co-operate in the formation and modification of linked list queues of chained descriptors/CDB's while an adapter channel to which the respective queue is directed is active, and to carry out the queue formation/modification procedure in potentially optimal time coordination with the adapter's handling of data transfers relative to the respective channel and queue; whereby a CDB can be added to or removed from a virtually empty queue (i.e. a queue whose CDB's have all been processed by the adapter) with minimal overall impact on processor and adapter performance.

In a preferred embodiment, each CDB consists of a block of information having a predetermined form and size (predetermined number of words, each of predetermined length), and defines a data transfer relative to a block of contiguous data storage locations in a memory to which the processor and adapter have direct access.

To dispatch an additional CDB for handling by the adapter, the processor stores the respective CDB in memory in an unlinked form, transfers a request to the adapter which contains information defining the memory location of the respective CDB, and the adapter processes the request by either immediately retrieving and initiating processing of the CDB located by the request, or by establishing a chaining and addressing linkage between the respective CDB and a CDB associated with a previously processed request.

With one exception, the request processing operation requires the adapter to obtain (direct) access to memory; for either reading a CDB to be immediately processed or writing a linking address pointer to a CDB previously queued by the adapter. The exception is currently processing an "unchained" CDB (e.g. the last one in a queue now empty). In that circumstance, the adapter transfers the CDB address information contained in the request from its request register into the CDB currently being processed. In effect, this establishes a chaining and addressing linkage between the current CDB and the CDB associated with the request.

In the preferred embodiment, the request information is buffered in a single request register in the adapter. If the adapter is busy processing a request currently contained in its request register, and the processor attempts to transfer another request, the adapter immediately returns a busy indication to the processor causing the latter to repeat the attempt later. If the adapter is a multi-channel adapter unit (MAU), the processor addresses each request to one of multiple address ports uniquely associated with the channel to which the respective CDB is directed, and the adapter reacts to the addressing of that port by setting a unique one of multiple latches associated with the respective channel. Thus, only one register and several latches are required to hold the request information in association with any adapter channel.

To remove a CDB from a queue formed by the adapter, the processor accesses the CDB in memory and writes a "skip" code into that CDB. When the adapter chains to a CDB containing a skip code, the adapter immediately recognizes a chaining event and either chains to a next CDB, if the CDB containing the skip code contains a linking pointer to a next CDB, or idles the channel to which the skipped CDB is directed.

If the processor writes a skip code to a CDB which has already been handled by the adapter, the skip code will only affect the adapter's operation if the CDB to which the code is written is part of a queue of CDB's which the adapter is repeatedly cycling through.

In the preferred embodiment, the CDB code field into which the skip code is written can be manipulated by the processor to define adapter actions other than skipping. Naturally, the skip code can be defined by a single "skip bit", if the only purpose of the respective code field is set adapter skipping "on" and "off".

Thus, it should be understood that by means of the foregoing arrangement, CDB's can be dispatched and deactivated (set for skipping) by a processor, relative to an active adapter channel, without regard to the instantaneous status of data transfer activity in the same channel, and with minimal impact on the integrity of such activity. When a CDB is dispatched, the handling of the associated request by the adapter assures that the CDB will be properly linked to the current channel activity. When a CDB is deactivated, the handling of that CDB prior to the deactivation has no effect on the respective channel activity, and the handling of the CDB after the deactivation results in the desired skipping action outlined above. Obviously, if a processor needs to instantaneously change the state of channel activity it can still accomplish that by a direct command to the adapter suspending channel activity. The deactivation by skipping is useful in situations where the sequencing of adapter channel activity is not otherwise critical or potentially compromised by the lack of coordination between the processor and adapter.

These and other objects, features, advantages and benefits of the present invention will be more fully understood and appreciated from the following description and claims.

BRIEF DESCRIPTION OF THE DRAWINGS

FIG. 1 schematically illustrates a prior art system environment in which the present invention can be advantageously used.

FIG. 2 schematically shows how chained descriptors are conventionally arranged and used in the environment of FIG. 1; i.e. how the descriptors are pre-enqueued by the originating processor in that environment.

FIG. 3 shows how descriptors and descriptor queues are arranged in accordance with the present invention to be directly manageable by adapter units.

FIG. 4 shows the form and content of a channel descriptor table (CDT) which, in accordance with the present invention, is maintained in registers of an adapter unit.

FIG. 5 shows the form and content of a channel descriptor block (CDB) which is useful in conjunction with the present invention.

FIG. 6 provides an overview of operations performed in accordance with the present invention, by an originating processor and an adapter unit, relative to CDB's dispatched by the originating processor to the adapter unit.

FIG. 7 provides an overview of operations performed by an originating processor and adapter unit to cause the adapter unit to skip performance of a data transfer process defined by a CDB previously dispatched to the adapter unit.

FIG. 8 illustrates the effect on adapter unit descriptor chaining operation of an active "queue count disable" bit in the CDB of FIG. 5.

FIG. 11 illustrates the logical organization of request sequencer logic in accordance with the invention which controls actions of a respective adapter unit relative to the handling of received CDB handling requests.

FIG. 12 illustrates specific operations performed by an originating processor to dispatch a CDB handling request to an adapter unit, and operations performed by the adapter unit to receive the respective request.

FIG. 13 illustrates details of request handling operations directed by the request sequencer logic of FIG. 11.

DETAILED DESCRIPTION OF PREFERRED EMBODIMENT

1. System Environment

Figure 9:
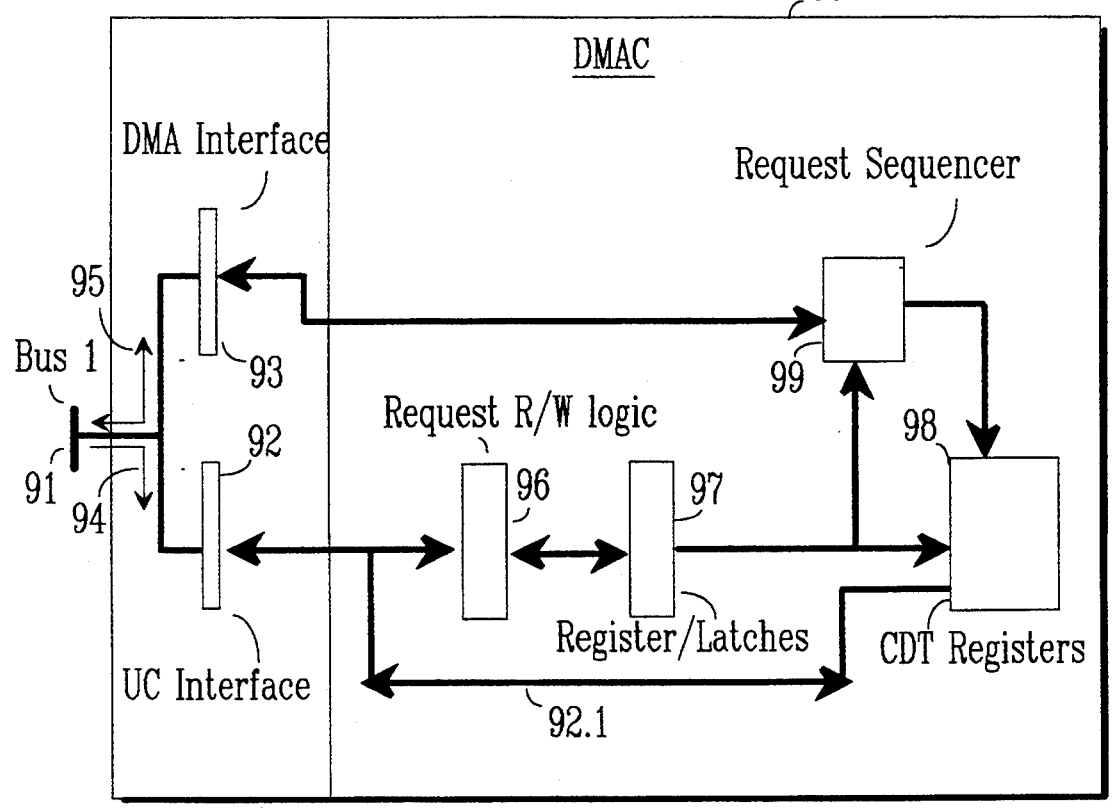
FIG. 9 is a high level schematic of the logical organization of an adapter unit for supporting CDB queue management operations in accordance with the present invention.

FIG. 1 illustrates how data processing systems, including prior art systems and the one to be described presently, are generally organized. FIG. 2 shows how chained descriptors and data are conventionally handled in such systems.

Bus 1 interconnects processor 2, memory 3, and adapter units 4–6. The adapter units are shown as multichannel adapter units (MAU's), each directing operations relative to multiple channels, but the invention to be described has potential beneficial application to single channel adapters. Each MAU is logically configured for operating as a DMA (Direct Memory Access) controller relative to memory 3, and for operating as a bus master, relative to bus 1 when accessing memory. Accordingly, each MAU may be required to arbitrate with other adapters (and possibly the processor) when it needs to control bus 1. Furthermore, each MAU is configured to operate as a slave attachment to bus 1 when processor 2 is directly exchanging information with the respective MAU via the bus.

As indicated for MAU 4, each MAU has a master bus control and DMA control (BC/DMAC) interface 4.2, through which the respective unit communicates with memory 3, and a slave unit control (UC) interface 4.3, through which it is addressed by processor 2 when data is being transferred directly between it and the processor. Each unit has external connections, as shown for MAU 4 at 4.5, through which its channels are coupled to devices and/or data communication links. Although shown as physically separate, the external connections may be time multiplexed on a single high speed link; e.g. a digital T1 or T2 telephone network link.

As suggested at 7 and 8, augmented by the legend 9, memory 3 contains Channel Descriptor Blocks (CDB's) and Channel Data Storage Blocks (CDSB's). Such blocks are stored in randomly selected storage spaces in the memory, and may be interspersed with each other and with other data (e.g. CDB's may be interspersed with CDSB's and processor programs, etc.). CDB's, as noted earlier, define operations to be conducted by adapters relative to respective data transfer channels. CDSB's represent memory storage spaces to and from which data is transferred relative to the MAU channels.

FIG. 2 illustrates a series of chained CDB's 15-17, beginning at 15, ending at 17, and including intermediate CDB's suggested at 16 and 18. These CDB's have associated CDSB storage spaces 19-22 for their respectively defined data transfers; CDB 15 having associated CDSB space 19, CDB 16 having associated CDSB space 20, CDB 17 having associated CDSB space 21, and CDB's 18 having associated CDSB spaces 22.

CDB's 15-17 may be directed to any channel in any one of the MAU's 4-6 in FIG. 1; denoted symbolically as channel "x" in MAU"y". Each CDB also has a number which defines its position in the chained series. Thus, the numbers and symbols shown characterize a chained series of m CDB's, beginning with CDBxy1 and ending with CDBxym. Each CDB contains information pointing to the starting location in memory of the associated CDSB; as suggested by the arrow extending from each CDBxyi to the lower left corner of the respective CDSBxyi. Each CDB, other than the last one in the series, also contains a pointer to the starting location at which the next CDB in the series is stored; as indicated by the arrow extending from the bottom of the box representing each CDB to the lower left corner of the box representing the next CDB in the series.

As suggested in the heading of FIG. 2, each CDB may define a transmit or receive data transfer to be conducted relative to the associated CDSB space; where a transmit data transfer is one in which data is read from the CDSB and transferred to a line or time slot at external interface 4.5, and a receive transfer is one in which data received at external interface 4.5 is written to the CDSB.

As indicated at 23, memory spaces in which the CDB's and CDSB's are stored are at random positions in the memory, and pointers contained in each CDB are placed there only by the processor 2.

2. Problem To Which Invention Is Directed

Although not explicitly stated in FIG. 2, the length m of the CDB chain shown therein is fixed when the CDB's are dispatched to the respective MAU for handling. Ordinarily, the CDB's in such a series are dispatched in a single operation in which the location of the first CDB in the series is signalled to the respective MAU channel. As explained earlier, coordination is required between the processor's reusage of storage spaces containing the CDB series and the activities defined by the series that are ultimately carried out in the adapter channel. Usually, such coordination is obtained by having the dispatching of each CDB chain coincide either with initial activation of the channel or with reactivation of the channel after a known state of inactivity; providing the processor with a reference point in time for at least determining when the channel activity started. However, since channel completion status relative to the activity associated with each CDB is signalled by an adapter interrupt request, that is handled by the processor after an indefinite real time delay, the processor has no mechanism for determining the instantaneous status of activity in the channel relative to a dispatched CDB chain.

Consequently, the processor can not "dynamically" append CDB's to a chain that has been dispatched, since to do so the processor would have to write a linking pointer into the CDB at the end of the dispatched chain, and the processor has no way to determine if that CDB is being or has been processed by the adapter. Thus, the processor is restricted to dispatching CDB's to any adapter channel, either individually or in "batched" chains, in coordination with periods of inactivity in the respective channel. Furthermore, the number of CDB's which the processor can dispatch at any time (i.e. in a "batched" chain) is restricted by the availability of memory space. If memory is used efficiently, there may not be enough space available at any instant of time (fragmented or contiguous) to store more than a few CDB's relative to each adapter channel.

Such restrictions—which have disadvantages of degrading channel (and therefore system) performance, and unnecessarily complicating channel activity scheduling functions performed by the processor—are avoided by means of the present invention, without compromising any other aspect of channel or system performance.

3. Functions of the Present Invention

FIGS. 3-8 indicate functional aspects of the invention; particularly functions performed by a processor and adapter which are considered unique to the present invention. The processor and adapter performing these functions may be parts of a system environment like that shown in FIG. 1. The adapter performing these unique functions may be either a single channel adapter or an MAU. In these and other figures, the adapter is shown as an MAU, in which a detail of implementation of "request receiving" logic supporting the invention can offer additional cost saving benefits beyond those associated with use of the invention relative to a single channel. However, it should be understood that the invention is otherwise fully applicable to single channel adapters.

3.1 CDB Queueing

FIGS. 3-7 are used to explain how CDB's are enqueued by the MAU in accordance with the present invention.

Referring to FIG. 3, the MAU contains dedicated sets of registers 30, one for each MAU channel, which are used to store a Channel Descriptor Table (CDT) that is modifiable by the MAU. The CDT registers are used to define a linked list queue of descriptors waiting to be processed relative to the respective channel, and also to hold the CDB which defines an operation currently being conducted in the respective channel (when that channel is currently active). Accordingly, when the respective channel is active, the CDT registers 30 are used to store a "currently active" descriptor "CDBI" (which has been retrieved from memory by the MAU and defines activity currently being conducted in the associated channel), and information defining a linked list queue of memory locations containing an arbitrary number m of other CDB's 32-34 (CDB2, . . . ,CDBm) waiting to be processed relative to the same channel. The CDB's in that queue are positioned in the sequence of receipt of associated processor requests (discussed below) and serviced in that sequence. Thus, as the MAU finishes processing the CDB contained in the CDT registers 30, it retrieves a next CDB from the "head" of the queue, processes that CDB, and continues retrieving and processing CDB's in successive positions in the queue until a last CDB, at the tail end position in the queue, has been processed.

As will be discussed in depth later, this linked list queue can be either pre-established by the processor, prior to activation of the associated channel, or it can be formed and managed by the adapter independent of the processor.

As suggested at 35-38, each CDB contains a pointer to a respective channel data block storage space (CDSB) in memory, to or from which data transfers defined by the respective CDB are to be directed. Thus, CDB1 contains a pointer to associated space CDSB1, CDB2 contains a pointer to associated space CDSB2, etc.

It should be understood that when the channel is inactive, the space reserved for CDB 1 in the respective CDT is vacant (or unused) and the linked list queue definable in the respective CDT is empty. Furthermore, it should be understood that when only a single CDB is available for processing relative to an active channel, a copy of that CDB (i.e. CDB 1) will be located in the CDT and the respectively definable linked list queue then will be empty. Thus, the definable linked list queue is non-empty only when the MAU has at least one CDB that is scheduled for processing but has not yet been retrieved by the MAU.

Relative to the environment of FIG. 1, the adapter registers constituting the CDT are addressable by processor 2 as discrete I/O device entities, through operations relative to bus 1 that are discussed later, and by the MAU as discrete internal elements. Thus, with one exception, either the processor or the MAU can transfer information to and read information from each CDT register. The exception, explained later, is a register position which in the preferred embodiment is readable but not writable by processor 2.

FIG. 4 shows the CDT registers in the order of their I/O address positions, and information functions that are stored in these registers when the associated channel is active. Register space 40 is used to hold "other information and commands", including parts of a CDB1 currently being processed and a Queue Count Disable ((QCD) bit 40a whose usage by the adapter is described below under "MAU Modes Of Operation".

Register space 41 is used to store a "data pointer" (DP) defining the initial address of a CDSB1 data block storage space associated with a CDB 1 currently being processed.

Register space 42 is used to store queue count (QC) and transfer count (TC) functions. QC represents the length of a linked list queue manageable by the adapter/MAU, and TC represents the number of bytes of data remaining to be transferred for a CDB1 currently being processed.

Register space 43 is used to store either a queue head pointer (QHP) or a preset address. When the respective channel is active, and the linked list queue is non-empty, space 43 contains a QHP function defining the memory location of a CDB which is to be retrieved and processed next by the adapter; i.e. the CDB currently positioned at the "head" of the queue. When the respective channel is active and the queue is empty, space 43 contains a preset address which defines the location in memory of a status buffer in which the adapter is to store status of an operation conducted relative to a CDB1 currently being processed.

Register space 44 is used to store channel control information contained in a CDB1 currently being processed. Such information includes an operation control code stored in sub-space 44a which is discussed later. One of the values to which this code can be set defines a "skip" (no-op) action. When the MAU retrieves a CDB containing this skip value, it automatically skips the data transfer (or other) operation defined by that CDB. If, at that time, the linked list queue definable by the other CDT information is not empty, the MAU immediately initiates retrieval and processing of the next CDB; i.e. the one located at the queue head position. This function, and associated effects, which are used by the processor to "remove" a CDB from a queue created by the adapter, are discussed further below.

Register space 45 is used to store queue tail pointer (QTP) information defining the location of the CDB at the tail end of the queue; i.e. the CDB which currently is the last one scheduled for retrieval and processing by the MAU. This function, and its usage are more fully discussed below under "MAU Modes Of Operation".

FIG. 5 shows information components of a CDB. Locations 50-55 represent a series of contiguous sub-blocks of a memory block containing the CDB. The starting address of the block is located at the bottom of sub-block 50, and the end of the block is located at the top of sub-block 55. When this CDB is part of a linked list queue defined in a CDT, the preceding CDB will contain a "chain pointer" discussed below designating the starting address of the block containing this CDB; i.e. the initial location of the space containing sub-block 50.

Sub-block 50 contains a "status buffer" for storing status relative to the MAU processing of a preceding CDB in a linked list queue containing this CDB and a preceding one. When the MAU completes its processing of the previous CDB, it uses the preceding CDB's QHP value (register space 43, FIG. 4) to locate this CDB's status buffer sub-space 50 as well as to locate this CDB as the next one to be retrieved and processed.

Sub-block 51 contains other information; i.e. the other information that gets entered into register space 40 (FIG. 4) when this CDB is retrieved by the MAU for processing.

Sub-block 52 contains a data pointer (DP), for locating the data storage space CDSB relative to which the data transfer defined by this CDB is to be conducted; i.e. the information to be entered into register space 41 (FIG. 4) when this CDB is retrieved for processing.

Sub-block 53 contains the transfer count (TC) defining the byte length of the data transfer defined by this CDB. This information is entered into the TC portion of register space 42 (FIG. 4) when this CDB is retrieved for processing.

Sub-block 54 contains a chain pointer (CP) that is set into register space 43 when this CDB is retrieved for processing. The value in the CP is set by the processor, before this CDB is dispatched to the MAU channel, and is altered by the MAU if another CDB is dispatched to the same MAU channel before the MAU finishes processing this CDB. When altered by the MAU, the CP points to the location of status buffer 50 in the next CDB and serves as a reference for locating and retrieving the next CDB.

Sub-block 55 contains channel control information defining the channel processing configuration for the MAU's processing of this CDB; i.e. this is the information that is entered into register space 44 (FIG. 4), when the MAU retrieves this CDB for processing, and that contains the control code 44a (FIG. 4) which is settable to the skip value mentioned earlier.

As explained later, under "MAU Modes Of Operation", the MAU is operable in "queue management" and "conventional chaining" modes relative to each channel that it controls. In queue management mode, the processor dispatches "requests" to the respective channel one at a time, each request defining the location in memory of a CDB block which at the time contains no information explicitly linking to any other CDB location. In this mode, the MAU is responsible for scheduling processing of CDB's associated with each request; which means that it manages construction of the linked list queue defined in the channel's CDT, and installation of CDB's into that queue when associated requests are received while the MAU is processing another CDB relative to the same channel.

Operations of the processor and MAU, when the latter is set to operate in queue management mode relative to a channel, are shown in FIG. 6. At 60, the processor stores a "new" CDB, and dispatches it to an MAU channel by passing a request to the MAU. The request is then processed by the MAU to schedule processing of the associated new CDB. Signalling processes by which the request is transferred to the MAU, and by which the channel to which each request is directed is indicated to the MAU, are described more fully below in reference to FIGS. 9-12.

Such requests are always dispatched one at a time, and handled one at a time by a "request sequencer" logic element in the MAU. Each request designates a starting address in memory at which an associated CDB is stored, and is accompanied by an indication of the MAU channel to which that CDB applies. After receipt of a request directed to a given MAU channel, the request sequencer logic performs a function to either initiate immediate retrieval and processing of the associated CDB or to enqueue that CDB on a linked list queue dedicated to the given channel. These linked list channel queues are constructed and managed by the MAU, the CDT (channel descriptor table) constructs of FIG. 4.

At 61, the MAU recognizes receipt of a request (in a request register described later), and activates its request sequencer logic to perform a scheduling function relative to the received request. The request sequencer examines the value of the queue count (QC) function of the channel to which the request is directed (reference register box 42, FIG. 4), and takes one of three actions according to whether the QC value is 0, 1, or greater than 1.

If the QC value is 0 (i.e. the linked list queue of the respective channel is currently empty, and the channel is currently idle), the request sequencer initiates retrieval and processing of the CDB associated with the just received request. The MAU then performs operations 62; in which it gets control of bus 1 (FIG. 1), accesses memory 3 (FIG. 1), retrieves the associated CDB from the location given in the request, and places the CDB in registers within the CDT register space dedicated to the respective channel (e.g. in registers 40 and 44, FIG. 4). While this is happening, the MAU request sequencer (described later) acts at 63 to increment the QC value by 1 and to perform another operation (also described later) to free up the above-mentioned request register so that it is available for receiving another request. Meanwhile, following entry of the CDB into the respective CDT, the MAU begins processing the operation defined by that CDB (data transfer or other operation) relative to the channel associated with the respective CDT registers.

If the examined QC value is 1, the MAU is currently processing the last CDB in the respective linked list queue, and operation 64 is performed to enqueue the CDB designated by the request at both the "head end" and "tail end" positions of the respective queue. In this operation, the request (new CDB address) is transferred to both the queue head pointer (QHP) and queue tail pointer register spaces in the associated CDT (i.e. to register spaces 43 and 45, FIG. 4). This is followed by action 63 to increment the QC value by 1.

If the examined QC value is greater than 1, the CDB associated with the request is installed at the tail end position in the respective linked list queue, via operations 65 and 66. In operation 65, the MAU writes the request (new CDB address) to the chain pointer position CP (54, FIG. 5) in the CDB previously holding the tail end position (i.e. the request address is written to the CP space in the memory location containing the CDB which currently occupies the tail end position in the queue defined by the CDT QTP function). To accomplish this, the MAU gets control of bus 1, adds an offset to the Queue Tail Pointer (QTP) in the CDT to generate the address of the CP position to be written, and controls memory 3 to write the new request data to that position. Concurrently, the request sequencer controls action 66 to transfer the new request data into the QTP position of the respective CDT register space (45, FIG. 4), thereby positioning the associated CDB at the tail end of the queue. Upon completion of both actions (65 and 66) the QC value is incremented by 1 (action 63) and the request register is freed up to receive another request.

3.2 CDB Dequeueing

FIG. 7 shows how the processor can effectively remove a CDB from a linked list queue that is managed by an MAU or single channel adapter in accordance with the foregoing discussion.

Recall that the channel control register space in the adapter CDT (44, FIG. 4) contains information included in the CDB currently being processed (corresponding to channel control information in the CDB memory space 55, FIG. 5). The CDB channel information that the adapter fetches to this register space contains a control code 44a that is settable by the processor either before or after the dispatching of an associated request to the adapter. One setting or position of this code defines a "skip" function. When the adapter retrieves a CDB, it immediately senses this code, and if it is set to the value designating the skip function, the adapter skips all other operations defined by the CDB. If the linked list queue associated with the respective channel is not empty when a skip function is detected, the adapter immediately chains to (retrieves) the next CDB located at the address defined by the Queue Head Pointer in the respective CDT (43, FIG. 4); otherwise, the adapter performs a concluding function (posts a status reporting interrupt request, etc.) and the channel is idled until a next request is received.

This procedure is illustrated in FIG. 7. At 70, the processor sets a skip function in a selected CDB directed to a specific adapter channel. At 71, the adapter/MAU finishes an operation relative to the same channel that is defined by a CDB it is currently processing. At 72, the adapter detects a chaining condition associated with completion of CDB processing in the respective channel. At 73, the adapter fetches a next CDB from memory to the CDT registers assigned to the respective channel (either a CDB at the head of a linked list queue definable in the CDT, or a CDB associated with a request just processed). At 74 the adapter branches on the condition of the skip function in the channel control field of the fetched CDB. If the function is not enabled, the adapter proceeds to process the fetched CDB via actions 71. But if the skip function is enabled, the adapter proceeds to actions 73 for fetching a next CDB to the respective CDT. Implied, but not shown here, is a possible waiting interlude until the adapter receives and begins handling a request directed to the respective channel; e.g. in the event that the respective linked list queue is empty when the enabled skip function is detected, and the adapter does not have an immediate CDB request to handle relative to the respective channel.

Now, consider the overall system effects of the foregoing skip function. If the processor enables a skip function in a given CDB after the adapter/MAU has processed that CDB (i.e. after the associated request has been transferred and the CDB has been reached in its duly scheduled sequence), the processor's actions will have no effect other than to have allowed the adapter to perform an operation (data transfer or other) that had been scheduled but may not have been necessary. On the other hand, if the processor enables a CDB's skip function before that CDB has been retrieved for processing by the adapter, the enabled function will cause the adapter to skip over the operation of that CDB, and chain to the next one in the associated link list queue, as if the CDB containing the enabled skip function had been physically removed from the queue; but with the additional latency associated with the retrieval and skip handling. This additional latency is considered minimal in terms of its potential interference with channel processing activities.

Furthermore, it should be understood that the virtual CDB removal effected by an enabled skip code is much simpler and efficient to implement than an actual physical removal. The latter would require the processor (with or without adapter cooperation) to be able to explicitly alter the queue structure by modifying a chain pointer (54, FIG. 5), in a CDB occupying the queue position preceding that of the CDB that is to be removed, to point to the CDB that is positioned next after the one to be removed.

However, locating these preceding and next CDB's could be very difficult. Since the CDB's do not have reverse chain pointers indicating their predecessors, location of at least the preceding CDB might require the adapter or processor to scan the chain pointers of all CDB's from the queue head position to the position of the CDB that is to be removed; i.e. to read the chain pointers of each from memory, establish the locations of the preceding and succeeding CDB's, and write the revised chain pointer to the preceding CDB. Obviously the time required for this could be much longer than the time required to retrieve and process a single CDB containing a skip code, and it is not certain that such a chain pointer modification could be made without risk of compromising the adapter's processing of the queue (i.e. without causing overruns or underruns in actual data transfer processes).

3.3 Effect of QCD Bit on CDB Chaining

The Queue Count Disable bit (QCD bit 40a, FIG. 4), in each CDT, can be set to either an "on" or "off" state by the processor (by an I/O Write operation addressed to the CDT register space). In the on state, this bit among other things prevents the adapter from modifying the queue count (QC) function in the CDT (in register space 42, FIG. 4). In the off state the bit allows modification of the QC function. However, the bit state is also used to control the mode of adapter operation in chaining to successive CDB's in the linked list queue defined by the respective CDT.

As shown in FIG. 8, in its preferred embodiment, the adapter varies its chaining action (the action taken by the adapter when it finishes processing a CDB) according to the state of the QCD bit (action 80). The adapter performs action 81 and subsequent actions if the QCD bit is off, and it performs action 87 and subsequent actions if the bit is on.

If the QCD bit is off, the adapter examines the QC value, branching to successive actions 82–85 if the QC value is 0 or 1, and branching to successive actions 86–88, and 85, if the QC value is greater than 1.

In action 82, the adapter either decrements the QC value to 0 or maintains it at a 0 value. In action 83, the adapter writes "completion" status to a memory location defined in the QHP register space 43 (FIG. 8). In action 84, the adapter posts a "queue underrun" exception condition (e.g. as an interrupt to the processor), suspends further activity relative to the associated channel until the processor responds to the exception and explicitly intervenes (in a manner to be explained), and exits (action 85).

In action 86, the adapter decrements the QC value by 1. In action 87, it writes status to the memory location indicated in the QHP register. In action 88, it fetches a next CDB from the memory location determined by the QHP reference to its CDT, which effectively initiates processing of the next CDB, and exits (action 85) with the processing of the next CDB continuing. As indicated between actions 87 and 88, relative to the environment of FIG. 1, the adapter retains control of bus 1 between the two actions relative to memory, i.e. between the writing of status and the reading of the next CDB; thereby avoiding the need to rearbitrate for control of the bus for action 88.

The relative operations of the processor and adapter when the QCD bit is set on and off, are described next.

3.4 Summary of MAU Modes of Operation

In the preferred embodiment, the operations of FIG. 8 are used by the processor to operate the adapter channel(s) in modes presently termed "slave mode" and "queue management mode". The slave mode results in operation of the channel in the conventional "prior art" manner, whereas the queue management mode results in channel operations according to the present invention. In slave mode, the QCD bit in the respective CDT is turned on by the processor (thereby disabling QC decrementing), and in queue management mode the same bit is mined off (enabling QC decrementing).

In slave mode, the processor preconstructs a linked list queue of chained CDB's directed to an adapter channel known to be idle or inactive when the queue is formed. Typically, this queue is formed in a "circular buffer" fashion, so that it does not have a "tail end" position. The processor provides each CDB in the queue with a chain pointer (CP) to the location of the next CDB in the queue, writes information to the respective adapter channel CDT setting the QCD bit to "on" and designating a first CDB position (i.e. establishing the QHP parameter in that CDT), and signals the adapter to activate the channel.

The adapter then proceeds to treat the queue as a prechained group; retrieving and processing successive CDB's in the queue, and disregarding the QC function in the CDT. The first or starting CDB is retrieved from the location designated by the QHP function in the CDT. Upon retrieval of the first CDB, from the memory location designated by the QHP function in the CDT, that QHP function is replaced with the CP factor in the retrieved CDB, thereby placing the next CDB at the queue head end position. When processing of the first CDB is concluded, the adapter performs a chaining operation; in which it writes status to the next CDB's status buffer in memory (reference position 50, FIG. 5, and action 87, FIG. 8), and (without release of bus 1) reads the next CDB to its CDT (reference action 88, FIG. 8). Then the adapter processes the retrieved CDB. This chaining and CDB processing continues through the succeeding CDB's, the adapter cycling "endlessly" through the circular buffer, until the channel is explicitly idled by a signal from the processor.

In queue management mode, the adapter channel's CDT is initialized with its QCD bit off, and its other parameters defining an empty queue. Thereafter, the processor sequentially dispatches "CDB Scheduling Requests" to the adapter channel, at arbitrary intervals. Each request designates the memory location of a CDB whose linking chain pointer field (54, FIG. 5) is empty or invalid; i.e. it does not explicitly indicate the location of another CDB. However, in response to each request, the adapter schedules processing of the associated CDB (in the sequence of receipt of that request relative to other requests directed to the same channel), and in the scheduling function the adapter may create an explicit linkage between the respective CDB and a CDB associated with a prior request (by writing a linking pointer to the chain pointer field of the latter CDB).

In its request scheduling function, the adapter determines if the linked list CDB queue, of the channel to which the request is directed, is empty; by examining the queue count (QC) value in the CDT associated with that channel. If the queue is empty, the adapter immediately retrieves and begins to process the CDB whose location is defined by the respective request. However, if the queue is not empty, the adapter performs operations to install the respective CDB at the tail end position in the queue; thereby scheduling the respective CDB for future processing in the proper sequence.

To install a CDB at the tail end position in a queue, the adapter writes the location of that CDB (which is contained in the respective scheduling request) into the queue tail pointer register space QTP, in the respective CDT, and into the memory space containing the chain pointer (CP) location (reference memory space 54, FIG. 5) of the CDB previously occupying the tail end position, if the latter CDB has not been dequeued for processing. To write to the CP location in memory, in the environment of FIG. 1, the adapter must first obtain control of bus 1.

CDB processing operations performed by the adapter in this (queue management) mode are essentially those indicated in FIG. 8; either actions 80–85, if the QC value is 1 or less when a chaining condition is detected, or actions 80, 81, 86–88, and 85 if the QC value is greater than 1 at chaining. When the QC value at chaining is 0 or 1, the queue underrun exception posted at 84 is eventually recognized by the processor, making the latter aware that the adapter channel's CDT queue is empty. If such queue underrun is not a source of error (data transfer overrun or underrun), the posted condition may prompt the processor to prioritize dispatch of additional CDB Scheduling Requests to the affected adapter channel.

In a contemplated variation of the foregoing adapter queue management mode, termed "extended queue management mode", the processor could initialize the adapter channel's CDT with a preconstructed queue (by setting meaningful queue count and end pointer information into the QC, QHP and QTP register spaces in the associated CDT) and then initialize the adapter to operate in queue management mode as above. In this extended mode, the adapter would retrieve and process the CDB's in the preconstructed queue exactly as it would have in slave mode, but also operate concurrently to append CDB's designated by "CDB Scheduling Requests" (furnished one at a time by the processor) to the tail end of the queue.

Naturally, each CDB at other than the tail end position in the preconstructed queue would be provided (by the processor) with a chain pointer to the location of the next CDB in the queue. This preconstruction would be done only at initialization of the respective channel, and only if the processor had sufficient memory space at the time to store the queued CDB's. It could give the adapter a slight lead advantage in CDB processing at channel initialization; but also could make the operations of the processor and adapter slightly more complex.

4. Processor-Adapter Interface For Handling CDB Scheduling Requests

Figure 10A:
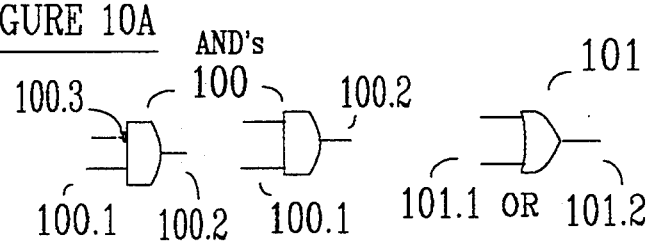
FIG. 10A illustrates logical And and logical or symbols used in FIG. 10.
Figure 10:
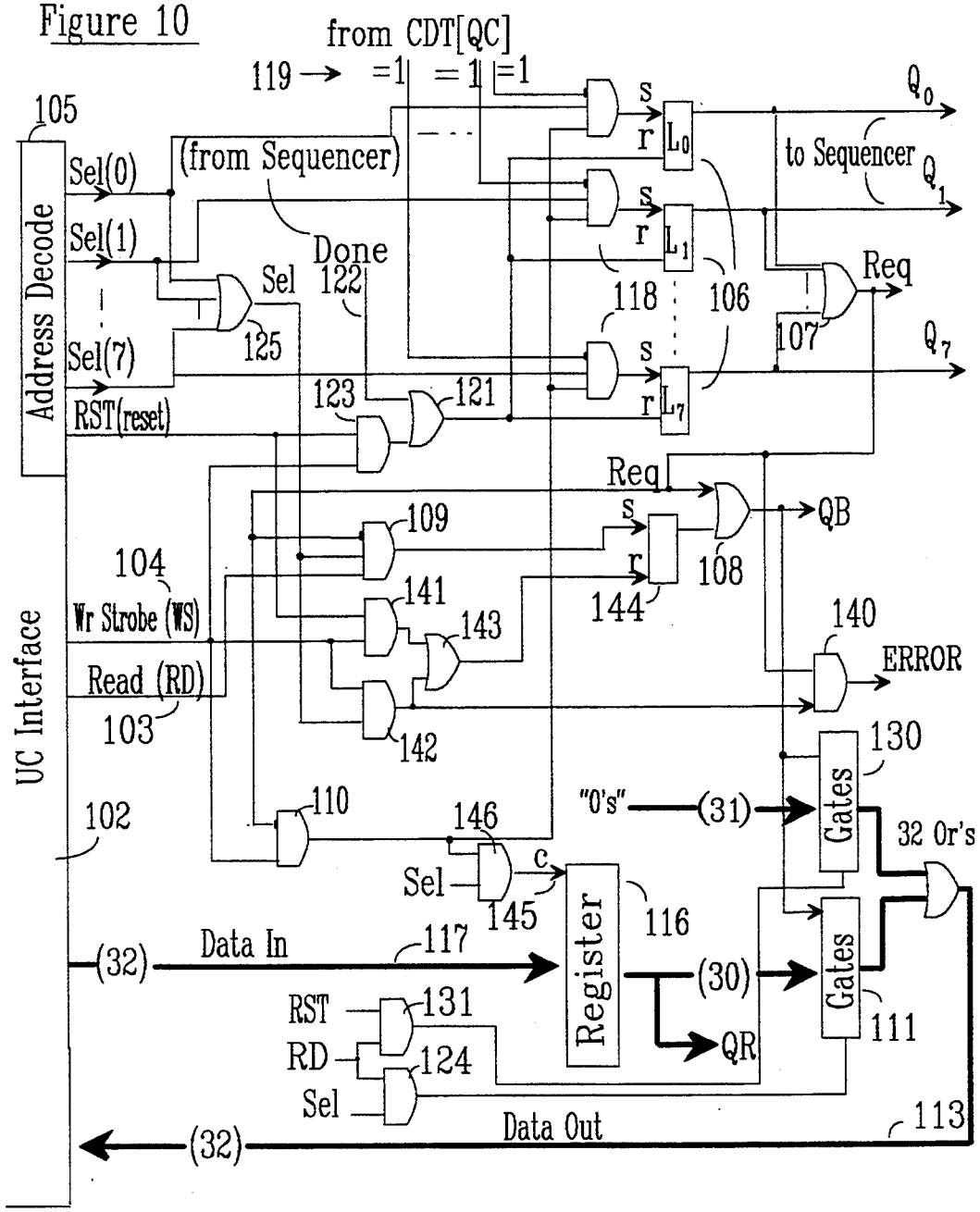
FIG. 10 is a detailed schematic of the logical organization of part of an adapter unit in accordance with the invention which is responsible for receiving new CDB handling requests dispatched from an originating processor.

FIGS. 9, 10A and 10 are used to describe the organization of a preferred embodiment of the processor-adapter interface associated with the transfer and handling of the above-mentioned CDB Scheduling Requests; with particular emphasis on the interface registers and logic used in a preferred MAU embodiment.

The overall organization of this interface is explained in section 4.1 below, with reference to FIG. 9, and details of logical symbols and elements are explained in section 4.2.

4.1 Request Interface—General

FIG. 9 shows the organization of the adapter for sustaining the foregoing queue management mode of operation; i.e. for receiving "CDB Scheduling Requests" sequentially from a processor, and scheduling processing of associated CDB's (whose locations are given by the requests) in the order of receipt of respective requests.

The environment of FIG. 1 is assumed. The adapter, shown at 90, has UC and DMAC interfaces to bus 91, indicated at 92 and 93, respectively. Bus 91 corresponds to the bus shown at 1 in FIG. 1, and has (not-shown) connections to (not-shown) processor and memory subsystems corresponding respectively to the processor 2 and memory 3 shown in FIG. 1. As in the previous explanation of this environment, directed communications between the processor and adapter are handled through the busing path shown at 94 connecting to the adapter's UC interface, with the bus controlled by the processor; and communications between the adapter and memory are handled through the busing path 95 connecting the adapter's DMA interface to the bus, with the adapter independently controlling the bus.

The directed communications controlled by the processor generally consist of I/O Read and I/O Write operations addressed to specific adapter elements linked to the UC interface. Included in such communications are the signalling functions by which above-mentioned CDB Scheduling Requests are transferred from the processor to the adapter. The adapter channel to which each request is directed is indicated in signals that are part of the communication. The request signalling operations are conducted only relative to adapter channels which have been initialized for queue managment mode operation (i.e. channels which have been initialized with QCD bit functions in respective channel CDT registers turned off).

Each request transfer involves one or more I/O Read operations, in which the adapter availability for request reception is polled by the processor, followed by an I/O Write operation in which the address of a CDB is transferred to a register in the adapter. In these I/O Read and I/O Write operations the adapter status signals read/polled by the processor, and the CDB address signals written by the processor, are transferred within the adapter, through gating (request R/W logic) circuits 96. Adapter registers and latches associated with reception of such requests are indicated at 97. Signals read/polled by the processor, in respect to a request indicate states of latches suggested at 97, and request data (CDB address) signals mitten by the processor are transferred to a request register shown at 97.

Logical signal transfer connections are provided in the adapter between the foregoing register/latches 97 and CDT registers 98 of individual adapter channels, and also between the register/latches 97 and request sequencer logic 99. Sequencer logic 99 operates relative to the CDT registers 98 and DMA interface 93 to implement the queue management mode request scheduling functions of the adapter. The sequencer operates relative to the CDT registers to modify queue parameters as needed to install the CDB associated with a request at the tail end of the queue. The sequencer operates relative to the DMA interface to write chain pointer information to tail end CDB's in memory, when appending request CDB's to a queue, and to fetch a CDB from memory to the CDT when the respective queue is empty at the time the scheduling function is implemented.

A direct data path, shown at 92.1, extends from UC interface 92 to CDT registers 98. This path allows data to be written directly from the processor to the CDT to dispatch pre-linked and prechained CDB's to the MAU (see previous discussion of "slave mode" operations).

In a preferred MAU adapter embodiment, to be explained later with reference to FIG. 10, request CDB addresses directed to all MAU channels are funneled through a single request register. Each such CDB address is accompanied by signals addressing a "logical port" in the MAU that is uniquely assigned to the adapter channel to which the operation defined by the associated CDB (the CDB whose location is given by the request) is to be applied. Logic in the MAU decodes these port address signals to set a latch uniquely associated with the respective port and MAU channel. Set state of a respective latch causes MAU request sequencer logic to schedule processing of the CDB whose location is given by the request relative to the MAU channel associated with the latch.

4.2 Request Interface—Preferred MAU Embodiment

FIGS. 10 illustrates a preferred embodiment of a request sequencer interface for an MAU type adapter. FIG. 10A shows logical symbols used to represent And gate and Or gate circuits in FIG. 10.

Referring to FIG. 10A, symbols for And gates are shown at 100 and an Or gate symbol is shown at 101. And gate inputs and outputs are indicated respectively at 100.1 and 100.2. Or gate inputs and outputs are indicated respectively at 101.1 and 101.2. The leftmost And gate symbol contains an inhibitory input 100.3.

For logical discussion, it is assumed that the output of the Or gate is active/1 when at least one input is active/1, and inactive/0 when all inputs are inactive 0. Similarly, it is assumed that the output of an And gate without inhibiting inputs is active/1 when all inputs are active, and inactive/0 if at least one input is inactive. For And gates with an inhibitory input, the output is active/1 if and only if the inhibitory input is inactive and all other inputs are active.

Referring to FIG. 10, relevant parts of the MAU request handling interface are shown to the fight of UC Interface 102 (which to the left connects via a bus 1 with a processor 2, as in FIG. 9). In the illustrated embodiment, the MAU contains 8 channels. Requests are transferred from the processor to the MAU through UC Interface 102.

Each request consists of one or more I/O Read operations discussed below, in which the processor polls the state of request handling activity in the MAU, followed by an I/O Write Operation in which the processor presents "request data" defining the memory location of a CDB. The read/polling operations are repeated when "request busy" status returns; indicating that previously written request data has not been handled by the MAU. The mite operation is evoked when a read operation returns "not busy" status.

Request read and write operations are respectively accompanied by Read signals at 103 and Write Strobe signals at 104, and by an address signal designating the MAU and a "port address" in the MAU. The MAU has 8 ports associated individually with its 8 channels. Accordingly, each port address effectively designates a specific 1 of the 8 channels.

Address decoder 105 decodes address signals accompanying each request, and activates one of 8 "port" selection lines Sel(i) (i=0-7) in response to the port address signals. The Sel lines are individually coupled to set inputs of 8 latches 106, through logic discussed below; to set respective latches 106 under logical conditions defined below. Latches 106 are associated individually with the 8 MAU channels, and their set outputs are applied to the Request Sequencer (99, FIG. 9), for indicating that request handling action is needed which requires MAU access to memory, relative to the MAU channel associated with the latch then set.

Above-mentioned logic between the Sel(i) lines and latches 106 operates to set a latch 106 when (coincidentally): a request is being written (Wr Strobe active at 104), all latches 106 then are in reset states, the respective Sel(i) line is active, and the queue count (QC) of the respective channel (the QC value in the CDT assigned to the channel) is not then 1. In that circumstance, the request scheduling function requires MAU access to memory, in order to modify the chain pointer CP of a CDB then occupying the tail end position of the queue. Latches 106 are needed because the latency of such access is indefinite; since it must be coordinated with real time data transfer processes then being conducted by the MAU. If the channel QC value is 1 when a request is being written, and other conditions mentioned above are present, the request handling function involves only local changes to CDT paramenters of a respective channel. These changes are effected instantly, and do not require latching of any request indication.

Or gate 107 activates request signal "Req" when any latch 106 is set. Signal Req is applied to Or gate 108, which activates "queue busy" signal QB when either of its inputs is active, and to inhibit inputs of And gates 109 and 110.

Signal QB is applied, through banks of And gates 111 and Or gates 112, to "Data Out" bus 113. Gates in bank 111 are enabled (by logic discussed below) only when Read signal at UC interface line 103 is active; i.e. only when the processor is signalling for a Request (status) read operation. In such instances, signals on Data Out lines 113 (including a signal representing the state of QB line) are returned to the processor (via UC interface 102 and not shown bus 1).

Accordingly, if the returned signals indicate that QB is active (i.e. that the MAU has not finished handling a previously written request) the processor relinquishes the bus, and repeats the Request read operation (at some later time). Conversely, if the returned signal indicates QB is inactive (i.e. that the MAU is free to handle another request), the processor retains the bus and follows immediately with a Request Write operation. In the latter operation, request data (designating a CDB location) is written unconditionally to MAU Request Register 116, via Data In lines 117 extending from interface 102 to that register.

Register 116 and latches 106 discussed above correspond to register/latches shown at 97 (FIG. 9), but with the distinction that requests directed to all 8 MAU channels are "funneled" (sequentially) through the one register 116.

Considering now the logic that detects the foregoing conditions for setting latches 106, And gates 118 (one per channel) have outputs connecting to set inputs of individual latches 106, and inputs determining when a respective output is to be activated. These gates have a common input from the output of gate 110, individual inputs from select lines Sel(i), and individual inhibit inputs from lines 119 carrying QC=1 channel count indications (developed by not-shown decoding logic connected to outputs of QC registers in individual channel CDT's). Gate 110 has a previously mentioned inhibit input, from output Req of Or 107, and a positive input from Write Strobe line 104.

Accordingly, gates 110 and 118, together with the (not-shown decode) logic detecting channel QC values of 1, operate to set a latch 106 when (coincidentally): a request is being written, Req is inactive (i.e. all latches 106 are then reset), and the QC value of the channel associated with the addressed request port is other than 1. As suggested above, when the QC value is 1, and conditions above are present, not-shown logic acts to immediately alter certain parameters in the respective CDT. Such (not-shown) logic includes gates for transferring the data on Data In lines 117 into QHP and QTP pointer spaces in the CDT associated with the active Sel(i) line, and gates for instigating incrementing of the QC value in the respective CDT (to a value of 2).

Latches 106 are reset, by a signal transferred to line 120 from Or gate 121, when either: (a) the sequencer signals completion of request handling, by a DONE indication at 122, or the processor performs a "Reset" Write operation detected by And gate 123 (an operation in which Wr Strobe and RST lines at the UC interface are activated).

Above-mentioned gates in bank 111 are activated/enabled (for resuming the QB function and data in Request Register 116 to the processor on a Request Read operation), when output of And gate 124 is active. And gate 124 has inputs connected to UC interface Read line 103 and output of Or gate 125. Or gate 125 has inputs from each of the Sel(i) interface lines, and is therefore active when any Sel(i) line is active. Accordingly, QB and request data in register 116 are returned to the processor when the latter signals a Request Read accompanied by a port address causing one of the Sel(i) lines to go active.

A point to note here is that there are 32 lines in each set of data lines shown in FIG. 10 (data in set 117 and data out set 113), indicated in paranthesis in the lines). However, register 116 receives only 30 of the data bits sent via lines 117; the two least significant bits being dropped because CDB's start at word boundary locations in memory. Accordingly, it is understood that the returned signal representing the state of QB is sent on one of the data out lines which would carry the two least significant bits of request data, if register 116 held a full 32 bits.

The returned request data is suitable for diagnostic usage; e.g. to allow the processor to determine if any request bits have been mistransferred. Another feature in FIG. 10, with potential diagnostic application, is represented by the bank of gates 130 shown above gate bank 111. Output of And gate 131 enables gates 130 when signals from the processor coincidentally activate signal lines RST (reset) and RD (read) at the UC interface. Gates 130 receive signal line QB, and 31 constant level inputs representing "0" values, and thereby return 32 bit signals to the processor; 31 of which should be 0's if the UC interface is operating properly.

Furthermore, the returned signal corresponding to QB is supposed to correspond to the state of latch 144 discussed below (which serves to keep QB active/busy from the time a processor polls a not busy state via gates 111 to the time the same processor writes a request to register 116; as a lock mechanism for preventing another task or processor from writing a request at the same time). Accordingly, the return path associated with gates 140 can be used by the processor to diagnose operations of the circuits which generate QB as well as integrity of the UC interface itself.

Other features used for sustaining operation of the invention, in multiprocessing or multitasking processor environments, are represented by functions controlled by And gates 140–142, Or gate 143, and latch 144.

In the environment of FIG. 1, consider a processing arrangement in which either processor 2 is configured for multitasking or plural processors share bus 1 with capability for dispatching CDB's to MAU's attached to the bus. Obviously, in this environment, it is necessary to prevent any processor or task for interfering with the integrity of a CDB request dispatch initiated by another processor or task. Thus, it is essential that when a first processor or task polls QB status of an MAU, and receives a "not busy" return, the MAU be rendered inaccessible to any other task or processor until the first processor has written its request. The purpose of logic 140–144 is to ensure that such activities can be carried out without conflict.

And gate 140 produces an output indicating error when Req and output of And gate 142 are simultaneously active. Output of And gate 142 is active if Wr Strobe and Sel are simultaneously active (i.e. while a task or processor is writing a request). Now, the latency of operations in the path from interface 102 to latches 106 is such that the Wr Strobe signal initiating writing of a request rises and falls before the latch associated with the selected channel port transfers to a set condition. Accordingly, Wr Strobe, Sel, and Req can be active simultaneously only if another task or processor is attempting to write a request after a first processor has written a request whose handling is still pending. In that circumstance, output of And 140 goes active, indicating an error (conflict). This Error indication is detected by the MAU, and reported to all tasks or processors (e.g. via MAU interrupt requests). The tasks or processors must then repeat their polling and request writing functions to ensure proper communication of respective requests.

Now, ordinarily, the error output just discussed should not occur because of actions controlled by latch 144 and And gate 109. Output of latch 144 is applied through Or gate 108 to activate QB when latch 144 is set. Latch 144 is set when output of And gate 109 is active, and reset when output of Or gate 143 is active; i.e. when output of either And 141 or And 142 is active. However, output of And 109 is active only while signals RD and Sel are (pulsed) active at the UC interface and Req is inactive (i.e. no latch 106 has been set).

It is seen therefore that if latch 144 is in reset state, and Req and QB are inactive, when a first task or processor signals for a Request Read, And 109 would be enabled, allowing latch 144 to be set. However, due to signal latencies mentioned earlier, before the latch could change state, and switch QB to busy status, the instantaneous not busy state of QB (associated with the instantaneous state of Req) will have been returned to the first task or processor (indicating that the MAU is available to have a request written). However, the setting of latch 144 immediately thereafter sets QB busy, so that if another task or processor were to read/poll QB status it would find it busy (and therefore continue to poll and not mite a request until it reads a QB not busy). Accordingly, a task or processor reading QB not busy is able to assume exclusive control of the MAU request path and exclusively write a request to register 116.

Now, logic 141–143 acts to reset latch 144 when a new request is written (WS and Sel coactive), but shortly after that occurs, a latch 106 (associated with the channel to whose port the request is addressed) is set, driving Req active. Consequently, QB is held busy by latch 144, from the time it is first read not busy to the time the reading task or processor writes a request, and thereafter QB is held busy by the active state of Req and remains busy until the request is processed by the request sequencer; so that a second task or processor can not in the interim read QB busy and write a request until the request written by the first processor or task has been written and processed.

The purpose of Or gate 140 is to detect when circuits associated with the foregoing manipulation and usage of QB malfunction. Thus, if Req is active while a request is being written (WS and Sel coactive), And's 140 and 142 are simultaneously enabled, causing Error signal to be raised (since the active Req represents prior commitment to a task or processor that last read QB not busy, and previously wrote a request, and in normal operation Req should be inactive at the instant that a new request is written).

Request Register 115 is reset by a signal applied to its "clear" input 145 via And gate 146. Output of And gate 146 is active when Sel and output of And gate 110 are coincidentally active; i.e. when a new request is about to be written.

4.3 Request Sequencer Logic

FIG. 11 shows the logical organization of the MAU request sequencer discussed above, relative to any channel i(i=0–7).

And gates 170, 171, and 172 respectively control generation of controls signals A, B and C. Control signal A is generated when QCi (the queue count of channel i) is 0, signal Qi is active (i.e. the latch 106 of channel i, FIG. 10, has been set), and the sequencer is ready to handle another request (signal "S. Rdy" active). Signal B is generated when QCi is greater than 1, Qi is set, and the sequencer is ready. Signal C is generated when QCi is 1 at the time UC lines WS (write strobe) and Sel(i) are pulsed (see FIG. 10).

Signals A and B are applied to DMA control logic 173 to respectively evoke read and write memory transfers. Signal A causes a CDB to be read from the memory location given by the Request last received (contents of register 116, FIG. 10), and entered into the CDT assigned to channel i. Signal B causes the last received request to be written to the CP (chain pointer) position of the CDB currently located at the tail end position of the queue defined by CDTi. Logic 178 provides a DMAC Done signal to the sequencer when the operation requested by signal A or B has been completed (i.e. when the logic has gotten control of the bus and read or written memory as requested).

Signal B is also applied to gate bank 174, to transfer QR (output of request register 116) to tail pointer register position QTPi in CDTi indicated at 175.

Signal C is applied to gate bank 176 to transfer UC Data In ("immediate" request data signals on lines 117, FIG. 10) to QTPi 175 and QHPi (the queue head pointer register in CDTi) 177.

Signals A, B and C are applied to logic indicated at 180, to cause the value of QCi to be incremented by 1, when: either C is active or A or B is active and DMAC Done has been signalled. When QCi is incremented, the signal Seq. Done is activated to reset latches 106 via line 122, FIG. 10.

The logic discussed above operates only when the respective CDTi is set for queue management mode (QCD bit off). As noted earlier, the processor does not write requests relative to channels set in slave mode (it dispatches CDB's to such channels pre-chained, etc.). Thus, port address functions and associated Sel(i) signals are not active when slave mode operations are being set up, so that conditions for generating signals A–C are not present.

4.4 Request Sequencer Operations

FIG. 12 provides an overview of request handling operations performed at the processor/MAU interface, and FIG. 13 is used to explain specific actions performed by the logic of FIG. 11 relative to received requests.

As shown in FIG. 12, the processor transfers a request by accessing the bus (action 210) and performing an I/O request read addressed to a channel port of a specific MAU (action 211). In response, (action 212), the MAU returns QR (representing contents of register 116, FIG. 10) and a representation of the state of QB (output of Or 108, FIG. 10); while at the same time setting latch 144 (FIG. 10) if QB is not busy at the instant of request receipt. Setting of latch 144 sets QB busy.

The processor conditions its next operation on the state of the returned QB signal. If QB is busy, actions 210-213 are repeated (after a delay which depends on other tasks the processor is performing and the availability of the bus, etc.). If QB is not busy at 213, the processor follows with an I/O request write addressed to the same MAU channel port (action 214); prefaced by acquisition of the bus, etc. At the MAU, actions 217 occur. Request data transferred in the write operation (CDB location) is entered into shared Request Register 116 (FIG. 10) and the decoded port address activates Sel(i) setting a latch 106 (FIG. 10) associated with the addressed port/channel. At the same time latch 144 (FIG. 10), which was set in the previous request read (action 212), is reset; deactivating the associated input of Or 108 (FIG. 10). However, setting of the channel latch 106 activates Req (output of Or 107, FIG. 10) which acts through Or 108 to keep QB busy until the request is processed by the sequencer (i.e. until the sequencer Done signal causes the respective latch 106 to be reset).

Sequencer operation relative to any channel i are suggested in FIG. 13. If associated channel signals Qi (state of associated latch 106, FIG. 10) and Sel(i) are inactive no action is taken (branch 231). If one of these signals is active, the next sequencer action depends on whether the value of the associated channel queue count, QCi (branch 232), is 0, 1 or greater than 1.

If Qi is active and QCi=0 (see inputs to And 170, FIG. 11), control signal A is activated (output of And 170, FIG. 11) and actions 233 are performed to read a CDB from memory to CDTi (i.e. the CDB at the location pointed to by the request).

If Sel(i) and WS are active and QCi=1 (see inputs to And 171, FIG. 10), control signal B is activated and actions 234 are performed to effect a local transfer of request data from the shared request register (116, FIG. 10) to QHPi and QTPi registers in CDTi; thereby positioning the associated CDB at both the head end and tail end of the respective CDB queue (since that CDB would be the only CDB in the queue in this circumstance).

If Qi is active and QCi is greater than 1 (see inputs to And 172, FIG. 10), control signal C is raised causing actions 235 to be performed; evoking a memory write action to write the request data to the CP location of the CDB currently situated at the tail end position of the respective channel queue.

After performance of any of operations 233-235, the respective queue count QCi is incremented (action 236) and the sequencer issues its Done signal (to reset the respective latch 106, etc.).

We claim:

1. A data processing system comprising:
   a random access memory;
   a processor for storing multiple channel descriptors non-contiguously in said memory; each descriptor defining a data transfer process that is to be performed between said memory and a data communication channel external to said system; each said descriptor being stored without regard to the immediate status of data transfer activity in said external channel and without explicit linkage to any other said descriptor;
   a channel adapter, connected to said memory, said processor, and said external communication channel, for directing performance of data transfers defined by said descriptors, and for managing scheduling of said data transfers offline to said processor:
   said adapter being responsive to requests presented sequentially by said processor, said requests indicating locations of respective descriptors in said memory, for selectively forming said descriptors, as stored in said memory, into a linked queue in which said descriptors are positioned in the queue in correspondence to the order in which respective said requests are received by said adapter, and wherein each descriptor in the queue, other than the descriptor designated by the last request received by said adapter, is explicitly linked to the location of a next descriptor in the queue.

2. A system according to claim 1 wherein said adapter comprises:
   latch means settable to busy and not busy states; said busy state indicating that said scheduling means has not completed scheduling of a previously presented said request and said not busy state indicating that said scheduling means is available to process another said request;
   a request register for temporarily storing a said request;
   means responsive to at least one I/O read operation from said processor preceding presentation of each said request for indicating the status of handling of a previously presented request;
   means responsive to an I/O write operation containing each said request for receiving the respective request in said request register and setting said latch means to said busy state;
   means conditioned by the busy state of said latch means for processing the descriptor locating information contained in a request currently stored in said register to establish a link between the descriptor location designated by that information and a descriptor designated by at least one previously presented said request; and
   means responsive to completion of said link establishing process for resetting said latch means to said not busy state.

3. A system according to claim 2 wherein said adapter comprises:
   register means dedicated to said channel for storing a channel descriptor table (CDT) defining a queue of descriptors; said CDT queue being constructed and managed by said scheduling means offline to said processor and concurrent with data transfer processes directed by said adapter; information in said CDT defining the number of descriptors currently waiting to receive data transfer processing service relative to said channel, the location in said memory of a said waiting descriptor which is the next one to be processed for data transfer service, and the location in said memory of a descriptor which is the last to be processed for data transfer service; and wherein said means conditioned by said latch busy state comprises:

means responsive to information instantly stored in said CDT for initiating operations either to retrieve the descriptor whose location is designated by the instant contents of said request register, for immediate processing of the data transfer defined by that descriptor, or to install the location of that descriptor into said CDT queue at the position making it the last to be processed for data transfer service.

4. A system according to claim 3 wherein:

said adapter is a multichannel adapter unit (MAU), which directs data transfers defined by said descriptors relative to multiple separate external channels linked to said unit;

said register means storing said CDT contains a separate CDT storage registers dedicated to each of said multiple channels; and said request register is used to hold requests directed to all of said multiple channels, one request at a time.

5. A system according to claim 4 wherein:

said latch means comprises multiple discrete latch means, each associated exclusively with a different one of said multiple channels;

said MAU comprises multiple request address ports individually associated with different ones of said latch means; said ports being individually addressable by said processor in conjunction with its presentation of a said request I/O write operation to said MAU relative to a respective one of said channels; and said MAU contains means responsive to presentation of each said request to set a busy state in the latch means associated with the port respectively addressed by said processor in conjunction with the request.

6. A system according to claim 1 wherein said processor can modify any one of said stored descriptors, after presenting a request to said adapter designating the storage location of that descriptor, without compromising data transfer operations scheduled and performed by said adapter relative to any other request.

7. A system according to claim 6 wherein said processor can modify said any one descriptor by writing a skip code in that descriptor, and wherein said adapter includes:

means for detecting a skip code in any descriptor retrieved by the adapter for data transfer processing; and means responsive to detection of a said skip code for skipping data transfer processing relative to the respective descriptor and immediately chaining to a next descriptor if the adapter has another descriptor to process.

8. A system according to claim 2 including a bus connected to said processor, said memory and said adapter; said bus being controllable by said processor while said requests are presented to said adapter and controllable by said adapter while said adapter is scheduling said data transfers and directing performance of said data transfers.

9. A system according to claim 8 wherein said bus is connectable to said adapter and at least one other adapter, and wherein said bus is controllable by each adapter during scheduling and performance of respective data transfers.

10. A system according to claim 8 wherein said adapter contains bus control logic, for acquiring control of said bus and controlling said bus during performance of respective scheduling and data transfer operations, and DMA (Direct Memory Access) control logic cooperative with said bus control logic for directly controlling access to said memory during said scheduling and data transfer operations.

11. A system according to claim 10 wherein the adapter means recited in claim 2 is integrated into said DMA control logic.

12. For a system in which an adapter has direct access control over a memory connected to a processor, and in which the adapter directs data transfers between said memory and a channel controlled by the adapter in accordance with information contained in descriptors prepared in the memory by the processor, an adapter comprising:

request receiving means for receiving requests sequentially from said processor at random intervals of time; said requests designating locations in said memory of descriptors placed in said memory by said processor; said descriptors designating tasks to be performed sequentially by said adapter relative to said channel in the order in which respective said requests are received; the descriptor designated by each request having no explicit linkage to any other descriptor when the respective request is received by said receiving means, and the descriptor designated by each request having a location in said memory which has no predetermined relation to the location of any other said descriptor;

scheduling means responsive to said received requests for forming said descriptors as stored into a linked queue in which each descriptor in the queue, other than the descriptor designated by a request last received by said request receiving means, is explicitly linked to a next descriptor in the queue, and wherein the descriptors are effectively positioned in the queue in an order corresponding to the order in which respective requests are received by said request receiving means; and means for retrieving and processing said descriptors, using said information written by said adapter, in the order of receipt of respective said requests, in order to perform the tasks defined by respective descriptors relative to said channel as if said queue had been formed by said processor and as if all of the descriptors in said queue had been presented to said adapter by said processor with chaining indications explicitly linking them in the order of their intended execution.

13. An adapter according to claim 12 wherein all of said means recited in claim 12 operate concurrently; so that while a task defined by one descriptor is being performed, a request designating another descriptor can be received and processed relative to said queue.

14. An adapter according to claim 13 wherein said scheduling means comprises means for constructing and maintaining a linked list queue defining the memory storage positions of at least a first and a last descriptor waiting to be processed.

15. An adapter according to claim 14, wherein a descriptor associated with any said request can be modified by said processor after presentation of the respective request, and wherein said means for retrieving and processing is logically configured to process the modified descriptor without compromising data transfers defined by any other descriptor.

16. An adapter according to claim 12 comprising:

latch means settable to busy and not busy states; said busy state indicating that said scheduling means has not completed scheduling of a previously presented said request and said not busy state indicating that said scheduling means is available to process another said request;

a request register for temporarily storing each said presented request;

means responsive to at least one I/O read operation from said processor preceding presentation of each said request for returning an indication of the state of said latch means to said processor;

means responsive to an I/O write operation containing each said request for receiving the respective request in said request register and setting said latch means to said busy state;

means conditioned by the busy state of said latch means for processing descriptor locating information contained in a request currently stored in said register to establish a link between the descriptor pointed to by said locating information and a descriptor designated by at least one previously presented said request; and means responsive to completion of said link establishing process for resetting said latch means to said not busy state.

17. An adapter according to claim 16 wherein said scheduling means comprises:

register means dedicated to said channel for storing a channel descriptor table (CDT) defining a queue of descriptors; said CDT queue being constructed and managed by said scheduling means offline to said processor and concurrent with data transfer processes directed by said adapter; information in said CDT defining the number of descriptors currently waiting to receive data transfer processing service relative to said channel, the location in said memory of a said waiting descriptor which is the next one to be processed for data transfer service, and the location in said memory of a descriptor which is the last to be processed for data transfer service; and wherein said means conditioned by said busy state of said latch means comprises:

means responsive to information held in said CDT for performing either a first or second operation; said first operation initiating retrieval and immediate processing of the descriptor stored at a memory location indicated in said request register, and said second operation installing the memory location indicated in said request register into the tail end position of said CDT queue, scheduling the descriptor at said designated location for last data transfer service.

18. An adapter according to claim 17 wherein said adapter is a multichannel adapter unit (MAU), for directing data transfers relative to multiple separate external channels linked to said unit, and wherein:

said register means contains a separate CDT storage register dedicated to each of said multiple channels; and said request register is used to hold requests directed to all of said multiple channels, one request at a time.

19. An adapter according to claim 18 wherein:

said latch means comprises multiple discrete latch means, each associated exclusively with a different one of said multiple channels;

said MAU comprises multiple request address ports, each associated with a different one of said channel and its respective latch means; said processor addressing a selected one of said ports in conjunction with its presentation of each said request I/O write operation to impliedly designate a respective one of said multiple channels; and said MAU contains means responsive to addressing of any said port in a request I/O write operation to set a busy state in the latch means associated with the respectively addressed port; thereby associating the request contained in said I/O write operation with the associated one of said multiple channels.

20. An adapter according to claim 12 adapted to handle a descriptor that has been modified by said processor, after presentation of a respective said request designating the location of that descriptor, in a manner which ensures that data transfer operations scheduled and performed relative to any other descriptor are not compromised.

21. An adapter according to claim 20 wherein said descriptors contain a code field that is modifiable by said processor to define a skip function, and wherein said adapter includes:

means responsive to a descriptor retrieved for data transfer service, and containing said code defining a skip function, for skipping data transfer processing relative to the respective descriptor and immediately chaining to a next descriptor if another descriptor is waiting to be processed.

22. An adapter according to claim 12, for use in a system containing a bus which interconnects said processor, said memory and said adapter; said bus being controllable by said processor while said requests are presented to said adapter; wherein said adapter comprises:

bus control means for controlling said bus independent of said processor when said adapter requires communication with memory for said scheduling and data transfer operations thereof.

23. An adapter according to claim 22, for a system in which said bus is bus is connectable to at least one other adapter and at least one other adapter which requires control of said bus while it directs performance of data transfers.

24. An adapter according to claim 22 comprising:

DMA (Direct Memory Access) control means cooperative with said bus control means for directly controlling access to said memory during said scheduling and data transfer operations.

25. An adapter according to claim 24 wherein said scheduling means, said bus control means and said DMA control means are integrated into a single logical entity.

* * * * *